(12) United States Patent
Takeyama et al.

(10) Patent No.: US 10,782,589 B2
(45) Date of Patent: Sep. 22, 2020

(54) WAVELENGTH CONVERSION APPARATUS, OPTICAL PARAMETRIC AMPLIFIER, TRANSMISSION APPARATUS, AND OPTICAL TRANSMISSION SYSTEM

(71) Applicant: FUJITSU LIMITED, Kawasaki-shi, Kanagawa (JP)

(72) Inventors: Tomoaki Takeyama, Yokohama (JP); Ichiro Nakajima, Kawasaki (JP); Yoshitaka Yamanaka, Hirakata (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/369,951

(22) Filed: Mar. 29, 2019

(65) Prior Publication Data

US 2019/0346738 A1 Nov. 14, 2019

(30) Foreign Application Priority Data

May 11, 2018 (JP) .................................. 2018-092225

(51) Int. Cl.
*G02F 1/35* (2006.01)
*G02F 1/39* (2006.01)
(Continued)

(52) U.S. Cl.
CPC ............ *G02F 1/3501* (2013.01); *G02F 1/395* (2013.01); *G02B 27/283* (2013.01);
(Continued)

(58) Field of Classification Search
CPC ................... G02F 1/3501; G02F 1/395; G02F 2001/3503; G02F 2001/3509;
(Continued)

(56) References Cited

U.S. PATENT DOCUMENTS

| | | | |
|---|---|---|---|
| 6,850,712 B1 | 2/2005 | Delavaux et al. | |
| 7,088,886 B2 * | 8/2006 | Mangir | G01S 7/292 |
| | | | 359/341.4 |

(Continued)

FOREIGN PATENT DOCUMENTS

| | | |
|---|---|---|
| JP | 2000-75330 | 3/2000 |
| JP | 2002-26818 | 1/2002 |

(Continued)

*Primary Examiner* — Daniel Petkovsek
(74) *Attorney, Agent, or Firm* — Staas & Halsey LLP

(57) ABSTRACT

A wavelength conversion apparatus includes a multiplexer-demultiplexer configured to include a first port, a second port, and a third port, a looped non-linear optical medium including one end that is optically connected to the second port of the multiplexer-demultiplexer, another end that is optically connected to the third port of the multiplexer-demultiplexer, and a main axis that rotates by 90 degrees between the second port and the third port, a first filter configured to be inserted into the non-linear optical medium, and remove stimulated Brillouin backscattered light that is bidirectionally generated in the non-linear optical medium, and a second filter configured to take out, from output light that is multiplexed in the multiplexer-demultiplexer after propagating through the non-linear optical medium and is outputted from the first port, conversion light having a third frequency different from the frequencies of a signal light and an excitation light.

14 Claims, 18 Drawing Sheets

(51) Int. Cl.
 *G02B 27/28* (2006.01)
 *H04J 14/02* (2006.01)
 *H04B 10/2537* (2013.01)

(52) U.S. Cl.
 CPC .............. *G02F 2001/3503* (2013.01); *G02F 2001/3509* (2013.01); *G02F 2001/392* (2013.01); *H04B 10/2537* (2013.01); *H04J 14/02* (2013.01)

(58) Field of Classification Search
 CPC .. G02F 2001/392; G02B 27/283; H04J 14/02; H04B 10/2537
 See application file for complete search history.

(56) References Cited

U.S. PATENT DOCUMENTS

| | | | |
|---|---|---|---|
| 7,133,581 B2 * | 11/2006 | Arahira | G02B 6/024 385/11 |
| 2004/0105615 A1 | 6/2004 | Okuno | |
| 2005/0099674 A1 | 5/2005 | Watanabe | |
| 2007/0206903 A1 | 9/2007 | Kovar | |
| 2008/0130097 A1 * | 6/2008 | McKinstrie | H04B 10/2537 359/330 |
| 2018/0231870 A1 * | 8/2018 | Takasaka | G02F 1/395 |

FOREIGN PATENT DOCUMENTS

| | | | | |
|---|---|---|---|---|
| JP | 2004-110020 | | 4/2004 | |
| JP | 2017076008 A | * | 4/2017 | ............... G02F 1/39 |

\* cited by examiner

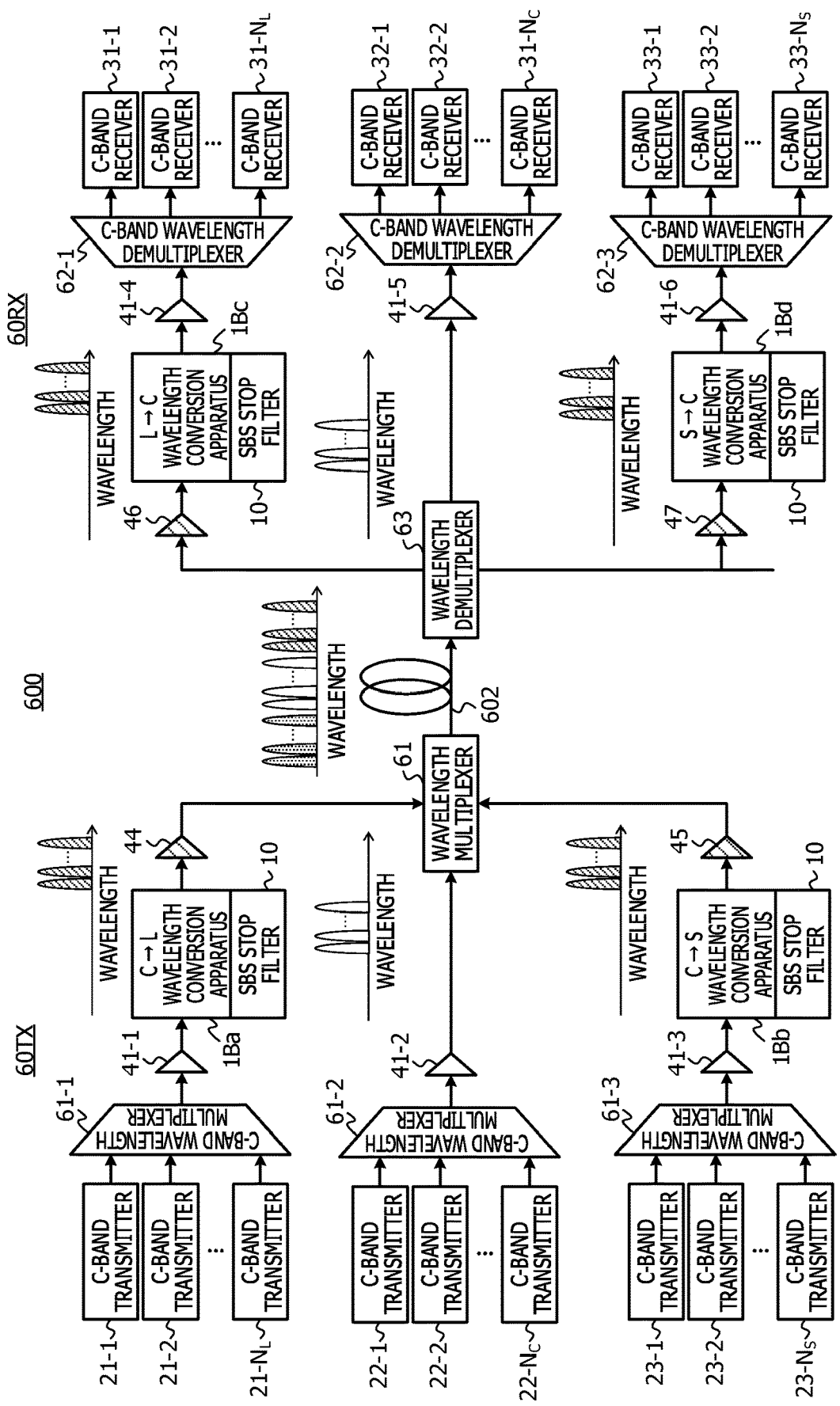

WAVELENGTH CONVERSION APPARATUS, OPTICAL PARAMETRIC AMPLIFIER, TRANSMISSION APPARATUS, AND OPTICAL TRANSMISSION SYSTEM

CROSS-REFERENCE TO RELATED APPLICATION

This application is based upon and claims the benefit of priority of the prior Japanese Patent Application No. 2018-92225, filed on May 11, 2018, the entire contents of which are incorporated herein by reference.

FIELD

The embodiments discussed herein are related a wavelength conversion apparatus, an optical parametric amplifier, a transmission apparatus, and an optical transmission system.

BACKGROUND

A technique of converting a wavelength of signal light using a four wave mixing (FWM) effect in an optical fiber has been studied and developed. The FWM is a phenomenon in which when two or more different wavelengths of light incident on a highly non-linear fiber (HNLF) generate one or more new wavelengths different from the incident wavelengths. A wavelength conversion technique in which a conversion band is wide and the dependence on polarization of the wavelength conversion efficiency is reduced has been also proposed (for example, see Japanese Laid-open Patent Publication No. 2000-75330). The wavelength conversion configuration less depending on the polarization state of signal light is called "polarization diversity".

In the wavelength conversion using the non-degenerate four wave mixing, when high power excitation light is incident on a non-linear optical medium, stimulated brillouin scattering (SBS) is generated. The SBS is scattering generated because an interaction of light and sound waves in a substance causes a shift in the frequency of vibration. When beams with high intensity propagate through a non-linear optical medium, the electric field vibration of the beam itself causes ultrasonic vibration of the optical medium by an electrostrictive effect, and the ultrasonic vibration (refractive index variation) causes the beam to scatter in a reverse direction of the incident direction.

A configuration in which an optical isolator is provided in a non-linear optical medium to reduce an increase in backscattered light by the SBS has been known (for example, see U.S. Unexamined Patent Application Publication No. 2007/0206903).

Having a polarization diversity configuration in which an optical isolator is inserted into a non-linear optical medium (for example, non-linear optical fiber), a wavelength converter does not function because signal light on one of polarization planes is blocked. This problem is described with reference to FIGS. 1A to 2D.

FIGS. 1A to 1D are schematic diagrams illustrating the wavelength conversion efficiency for a wavelength converter having a polarization diversity configuration, and FIGS. 2A to 2D are schematic diagrams illustrating the wavelength conversion efficiency of the configuration in FIGS. 1A to 1D in which optical isolators are inserted. In the wavelength converter having the polarization diversity configuration, a looped polarization maintaining fiber (PMF) 12 is connected to a polarization beam splitter/combiner (hereinafter, referred to as "PBS") 90 (FIG. 1A). Signal light $E_S$ and excitation light $E_P$ are inputted into a port 90A of the PBS 90 from an optical circulator 8, and are each separated into two polarization components that are orthogonal to each other. Optical components (for example, light having electromagnetic field distribution of a TM mode) having a first polarization plane propagate through the PMF 12 from a port 90B, and optical components (for example, light having electromagnetic field distribution of a TE mode) having a second polarization plane propagate through the PMF 12 from a port 90C. Conversion light $E_C$ is generated by the four wave mixing in the PMF 12. The polarization components are multiplexed in the PBS 90, the multiplexed component is sent from the optical circulator 8 to a band path filter 14, and the conversion light $E_C$ is taken out in the band path filter 14.

For convenience, when the PMF 12 is not looped (FIG. 1B), the TM power of the excitation light during the propagation through the PMF 12 from the port 90B toward the port 90C decreases due to SBS backscattered light in the reverse direction, which causes a failure to obtain sufficient conversion light power in the port 90C (FIG. 1C). Similarly, the TE power of the excitation light from the port 90C toward the port 90B decreases due to SBS backscattered light in the reverse direction, which causes a failure to obtain sufficient conversion light power in the port 90B (FIG. 1D).

When optical isolators (indicated as "ISO" in FIGS. 2A and 2B) that allows the transmission of light in one direction (for example, a direction from the port 90B toward the port 90C) are inserted into the PMF 12 as in FIGS. 2A and 2B in order to reduce the SBS backscattering, the optical isolators reduce the SBS backscattered light of the light of the TM component, and enable sufficient conversion light to be obtained in the port 90C (FIG. 2C). However, the light of the TE component that is to propagate from the port 90C to the port 90B is made nearly zero by the first ISO into which the light of the TE component is inputted, so that no conversion light is obtained in the port 90B (FIG. 2D). Since the signal light and the excitation light of one of the polarization components are blocked, the configuration in FIGS. 2A and 2B do not function as a wavelength converter of a polarization diversity type. The same problem occurs when optical parametric amplification is performed using a non-linear optical effect.

In view of the above, it is desirable to reduce the SBS backscattering, and use the non-linear optical effect with high efficiency.

SUMMARY

According to an aspect of the embodiments, a wavelength conversion apparatus includes a multiplexer-demultiplexer configured to include a first port, a second port, and a third port, allow input light including signal light and excitation light having different frequencies to enter the first port, and separate the input light into the second port and the third port, a looped non-linear optical medium including one end that is optically connected to the second port of the multiplexer-demultiplexer, another end that is optically connected to the third port of the multiplexer-demultiplexer, and a main axis that rotates by 90 degrees between the second port and the third port, a first filter configured to be inserted into the non-linear optical medium, and remove stimulated Brillouin backscattered light that is bidirectionally generated in the non-linear optical medium, and a second filter configured to take out, from output light that is multiplexed in the multiplexer-demultiplexer after propagating through the non-linear optical medium and is outputted from the first port, conversion light having a third frequency different from the frequencies of the signal light and the excitation light.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is an overview diagram of a transmission apparatus and an optical transmission system in which the wavelength conversion apparatus in the first embodiment is used;

DESCRIPTION OF EMBODIMENTS

In embodiments, at least one stop filter that blocks SBS backscattered light is inserted into a non-linear optical medium.

First Embodiment

Figure 1A:
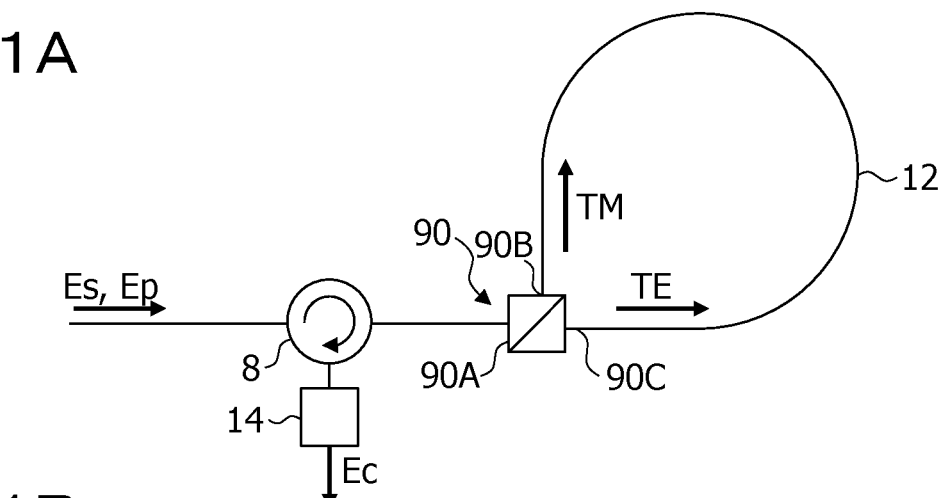
FIGS. 1A to 1D are diagrams for explaining a problem of SBS backscattering in a wavelength conversion configuration of a polarization diversity type.
Figure 1B:
Figure 1C:
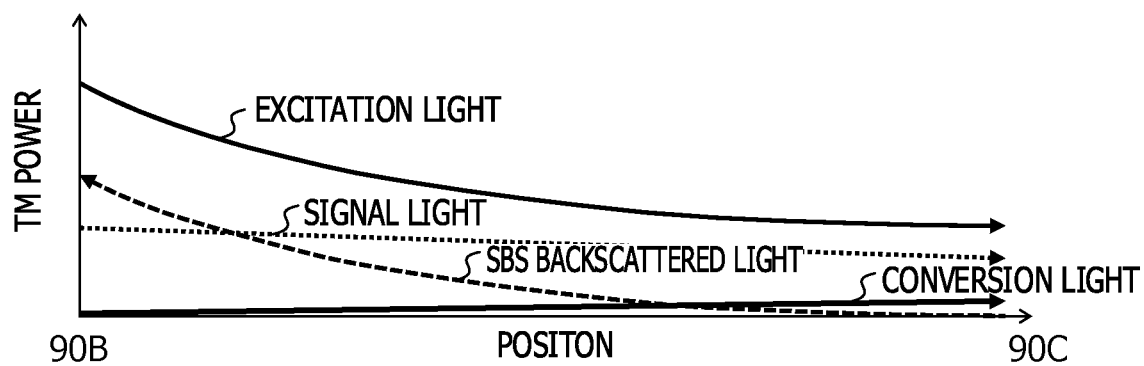
Figure 1D:
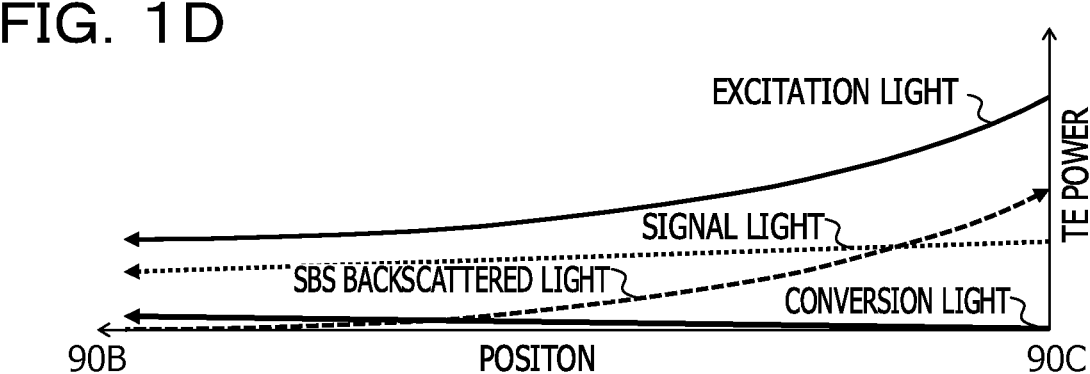
Figure 2A:
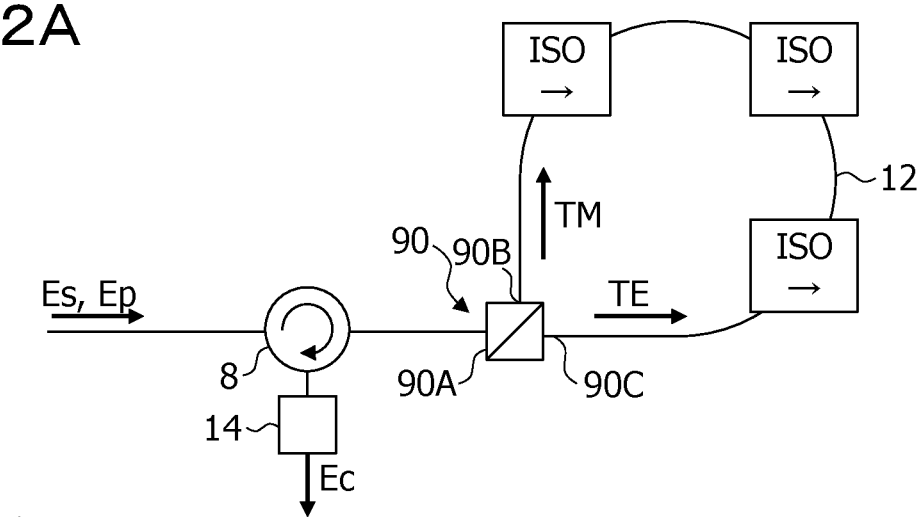
FIGS. 2A to 2D are diagrams for explaining a problem that is caused by inserting optical isolators in the wavelength conversion configuration in FIGS. 1A to 1D.
Figure 2B:
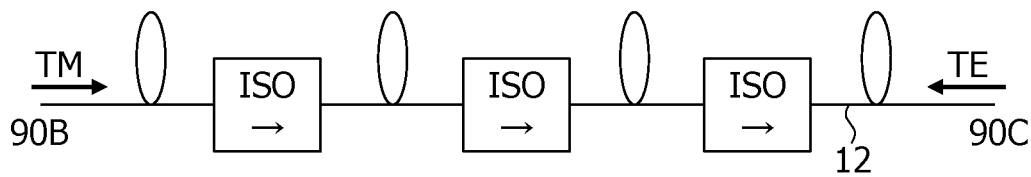
Figure 2C:
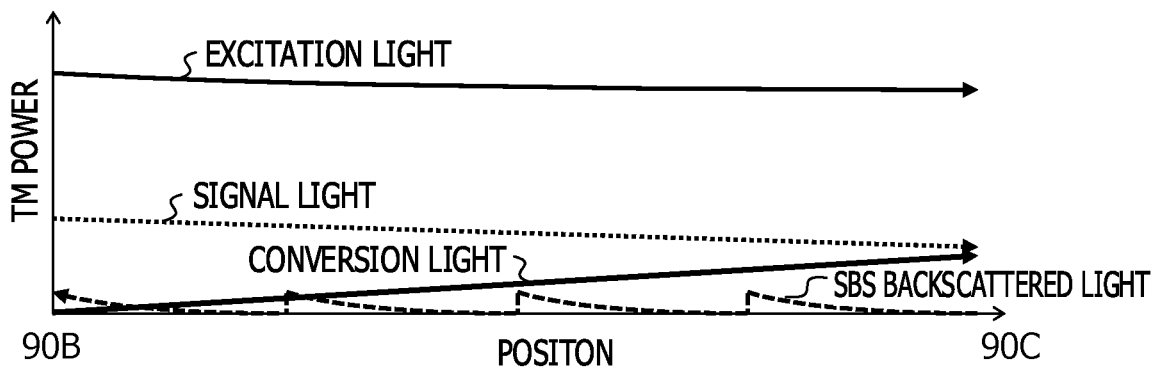
Figure 2D:
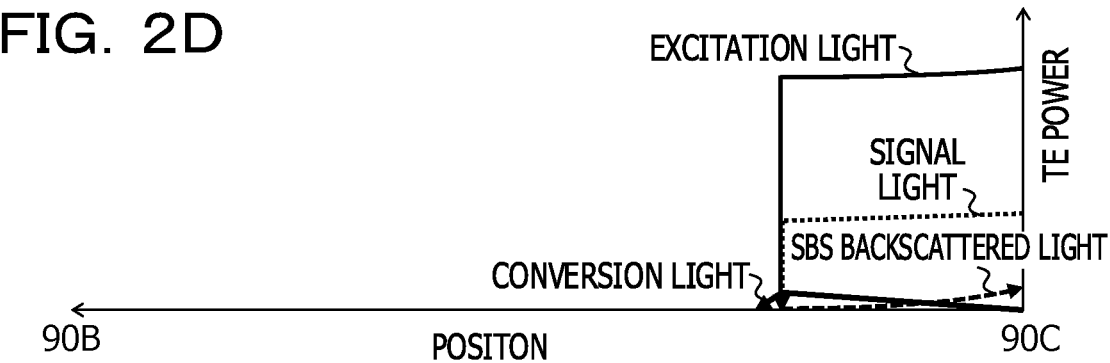
Figure 3:
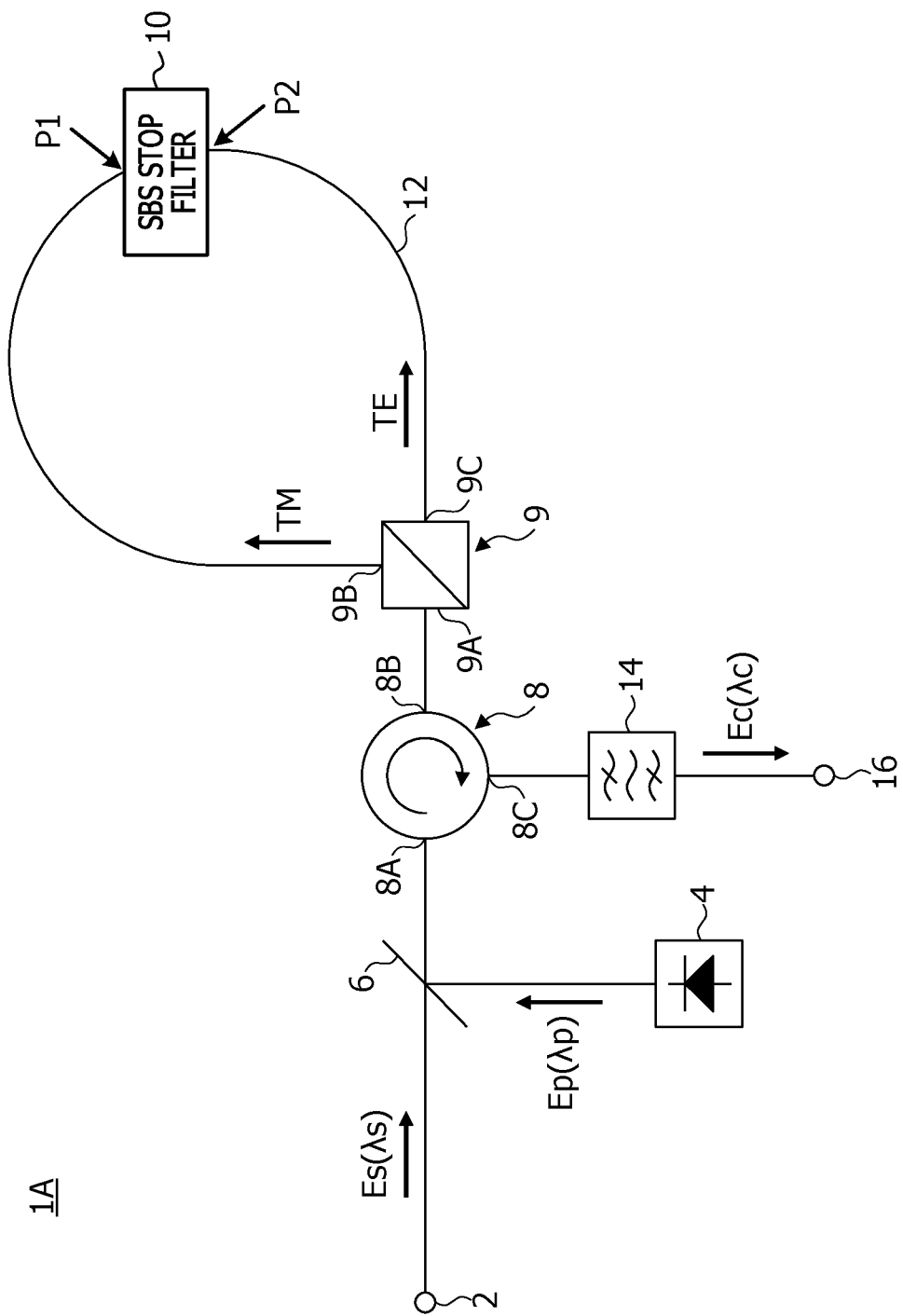
FIG. 3 is a schematic diagram of a wavelength conversion apparatus according to a first embodiment.

FIG. 3 is a schematic diagram of a wavelength conversion apparatus 1A according to a first embodiment. The wavelength conversion apparatus 1A includes an PBS 9 that separates and polarization synthesizes signal light $E_S$ and excitation light $E_P$ to be inputted into two polarization components that are orthogonal to each other, a looped non-linear optical medium that is optically connected to the PBS 9, and an SBS stop filter 10 that is inserted into the non-linear optical medium and bidirectionally blocks SBS backscattered light. The non-linear optical medium is, for example, a polarization maintaining fiber (PMF) 12.

The signal light $E_S$ is inputted from an input port 2, and is multiplexed with the excitation light $E_P$ that is outputted from an excitation light source 4 in a multiplexer 6. The multiplexer 6 is an optical coupler, for example. The signal light $E_S$ and the excitation light $E_P$ have different energy (wavelengths). The wavelength of the signal light $E_S$ is expressed by $\lambda_S$, and the wavelength of the excitation light $E_P$ is expressed by $\lambda_P$.

The multiplexed signal light $E_S$ and excitation light $E_P$ are inputted into a port 8A of the optical circulator 8, and are outputted from a port 8B thereof. The port 8B is connected to a port 9A of the PBS 9. Out of multiplexed light of the signal light $E_S$ and the excitation light $E_P$ that has entered the port 9A, for example, light having a polarization plane vertical to the drawing surface of FIG. 3 is coupled to a port 9B, and enters the PMF 12. The light that enters the PMF 12 from the port 9B fits a TM mode of the PMF 12. Meanwhile, out of the incident light into the port 9A, light having a polarization plane in parallel with the drawing surface of FIG. 3 is coupled to a port 9C of the PBS 9, and enters the PMF 12 from the reverse direction. The light that has entered the PMF 12 from the port 9C fits a TE mode of the PMF 12.

The loop of the PMF 12 is spatially twisted by 90 degrees between the port 9B and the port 9C. Out of two polarization axes that are orthogonal to each other, the main axis of the polarization of the PMF 12 coincides with the direction vertical to the drawing surface of FIG. 3 at a connection end with the port 9B, and allows the light of the TM component to propagate. The main axis of the polarization of the PMF 12 rotates by 90 degrees at a connection end with the port 9C and faces in the direction in parallel with the drawing surface of FIG. 3, and allows the light of the TE component to propagate.

SBS backscattered light having the respective polarization components that bidirectionally propagate through the PMF 12 is removed by the SBS stop filter 10, whereas the signal light $E_S$ and the excitation light $E_P$, and conversion light $E_C$ generated by the four wave mixing pass through the SBS stop filter 10. Here, when an angular frequency of the signal light $E_S$ is denoted by $\omega_S$, and an angular frequency of the excitation light $E_P$ is denoted by $\omega_P$ ($\omega_P \neq \omega_S$), the conversion light $E_C$ having an angular frequency $(2\omega_P - \omega_S)$ is generated by the four wave mixing in the non-linear PMF 12.

The light of the TM component having propagated through the PMF 12 from the port 9B, the polarization direction of which is rotated by 90 degrees, is coupled to the port 9C. The light of the TE component having propagated through the PMF 12 from the port 9C, the polarization direction of which is rotated by 90 degrees, is coupled to the port 9A from the port 9C. The light of the TM component and the light of the TE component multiplexed by the PBS 9 are inputted from the port 8B of the optical circulator 8, and are outputted from a port 8C thereof. The light that is outputted from the port 8C of the optical circulator 8 includes the signal light $E_S$, the excitation light $E_P$, and the conversion light $E_C$. The light outputted from the port 8C is guided to the band path filter 14, and the conversion light $E_C$ is taken out and outputted from an output port 16.

Figure 4:
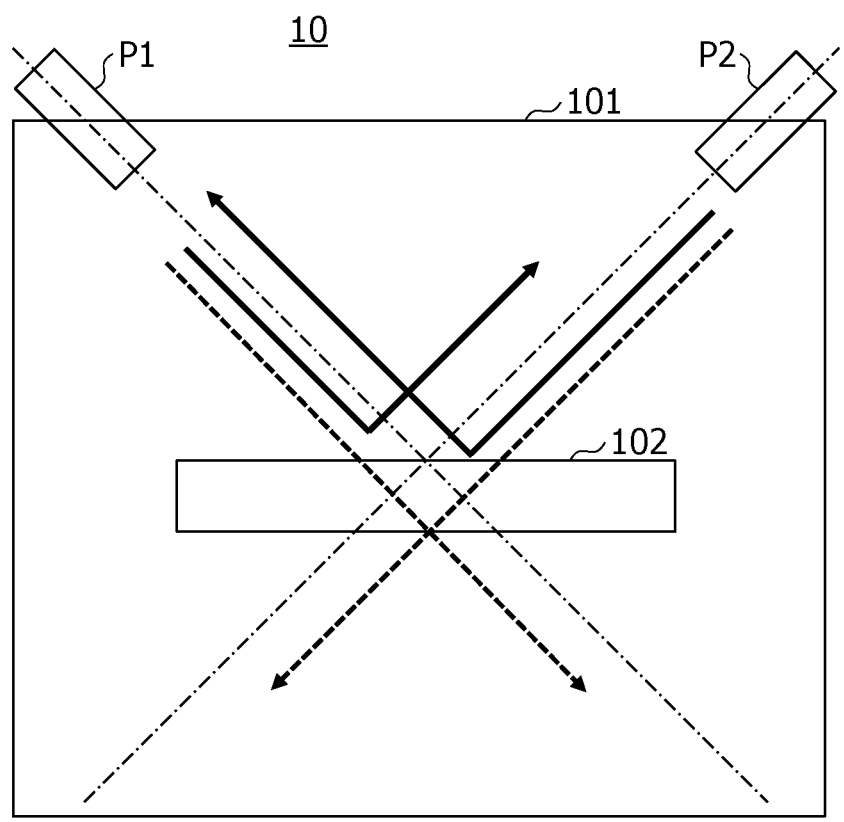
FIG. 4 is a diagram illustrating a configuration example of a stop filter that is used in the wavelength conversion apparatus in FIG. 3.

FIG. 4 is a schematic diagram of the SBS stop filter 10 that is inserted into the PMF 12. As the SBS stop filter 10, a commercially available optical filter capable of cutting out a frequency component in a narrow-band width may be used. In the example in FIG. 4, the SBS stop filter 10 removes only the SBS backscattered light, and takes out the signal light $E_S$, the excitation light $E_P$, and the conversion light $E_C$, using a narrow-band transmitting film 102. The narrow-band transmitting film 102 is provided in a housing 101 including a port P1 and a port P2, for example. The port P1 is connected to the PMF 12 that extends from the port 9B of the PBS 9, the port P2 is connected to the PMF 12 that extends from the port 9C of the PBS 9.

Out of light (for example, TM waves) having one of the polarization components emitted from the port P1, only the SBS backscattered light passes through the narrow-band transmitting film 102, the signal light $E_S$, the excitation light $E_P$, and the conversion light $E_C$ are reflected by the narrow-band transmitting film 102 and are coupled to the port P2. Similarly, out of light (for example, TE waves) having the other polarization component emitted from the port P2, only the SBS backscattered light passes through the narrow-band transmitting film 102, the signal light $E_S$, the excitation light $E_P$, and the conversion light $E_C$ are reflected by the narrow-band transmitting film 102 and are coupled to the port P1.

With this, the TM waves and the TE waves from which the SBS backscattered light is removed propagate through the PMF 12, are multiplexed in the PBS 9.

Figure 5A:
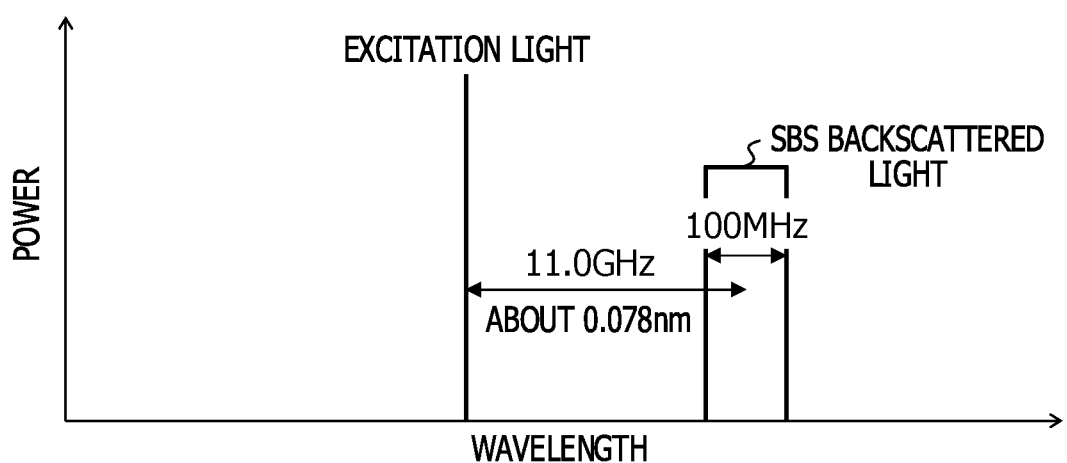
FIGS. 5A and 5B are diagrams illustrating a relation between SBS backscattered light and excitation light.
Figure 5B:
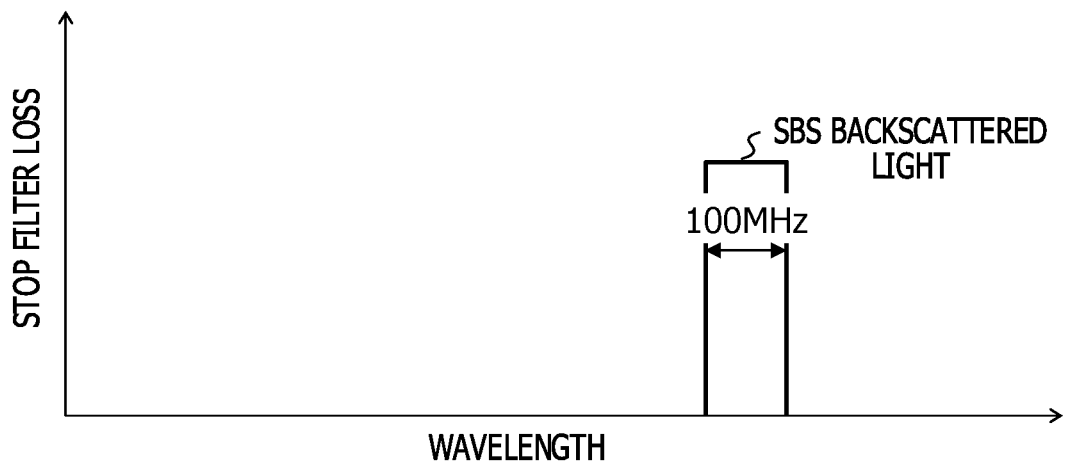

FIGS. 5A and 5B are diagrams illustrating a relation between SBS backscattered light and excitation light. The SBS backscattered light is generated at a wavelength position shifted from the excitation light energy (frequency of vibration) to a low-frequency side by a prescribed amount of energy (FIG. 5A). This is due to an interaction with the acoustic vibration in the medium caused by the radio wave vibration of the excitation light. When the wavelength of the excitation light is 1550 nm, optical components in which the amount of approximately 11 GHz is shifted from the wavelength of the excitation light are backscatterred. In the Stokes-shift process, components that are shifted from the excitation light only by approximately 11 GHz to a low-frequency side (long wavelength side) are backscatterred. The spectrum width of the SBS backscattered light depends on the material for the PMF 12, and is about 100 MHz, for example.

Figure 6:
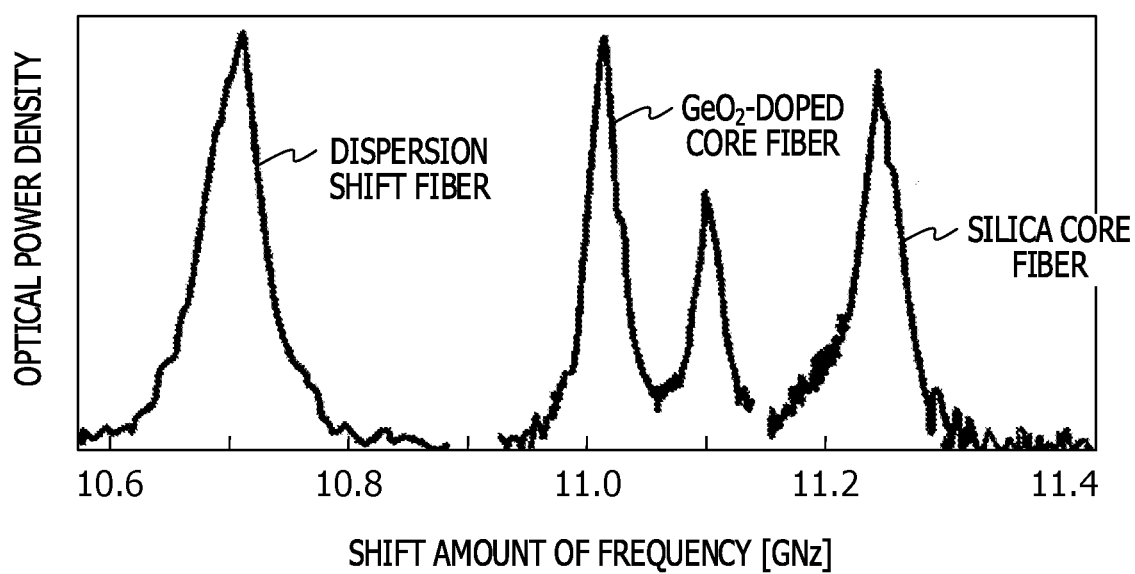
FIG. 6 is a diagram of SBS spectra in various non-linear media.

FIG. 6 illustrates the SBS spectra in various media. The horizontal axis indicates the shift amount of frequency, and the longitudinal axis indicates the optical power density. Although there is a few difference depending on the types (materials) of the optical fiber, the shift amount is 10.6 GHz to 11.4 GHz. A $GsO_2$-doped core fiber with the increased refractive index of the core has the shift amount of frequency by the SBS of 11.0 GHz, and the spectrum width thereof of approximately 100 MHz.

Returning back to FIGS. 5A and 5B, if only SBS backscattered light having a frequency apart by about 11.0 GHz from the excitation light is able to be removed, it is possible to take out light the wavelength of which is effectively conversed while reducing the lowering of the excitation light. Employing the arrangement configuration in FIG. 4 as a filter configuration enables only the SBS backscattered light to be removed from each of the TM waves and the TE waves that bidirectionally propagate. A light loss by the SBS stop filter 10 (FIG. 5B) occur only in the SBS backscattered light, and propagation losses of the excitation light and the signal light are reduces.

The narrow-band transmitting film 102 is implemented by, for example, a laminated film in which two types of films having different refractive indexes are repeatedly provided. When a transmission center wavelength is $\lambda_0$, an optical film thickness of the different two types of films is $\lambda_0/4$. When a film on a low-refractive index side is denoted by L, and a film on a high-refractive index side is denoted by H, the lamination of the narrow-band pass filter is expressed by $$\text{Sub}/(HL)^n \cdot H \cdot 2mL \cdot H \cdot (LH)^n/\text{Air} \quad (1),$$

where Sub indicates the substrate, Air indicates an air layer with which the outermost layer comes into contact, and $(LH)^n$ indicates a mirror layer in which n L and n H films are alternately provided. A cavity layer is indicated as 2 mL indicates, which indicates that the thickness of the film L on the low-refractive index side is multiplied by 2m (m is an integer). The light that enters the cavity layer is reflected by the mirror layers on the both sides. Adjusting 2 mL determines the wavelength of the filter.

One cavity is provided in the formula (1), however, the configuration between the substrate and the air layer in the formula (1) is made to be multistage as in a formula (2) to enable the transmission characteristics to be steeper.

$$\text{Sub}/[(HL)^n \cdot H \cdot 2mL \cdot H \cdot (LH)^n \cdot L]^k/\text{Air} \quad (2)$$

Figure 7:
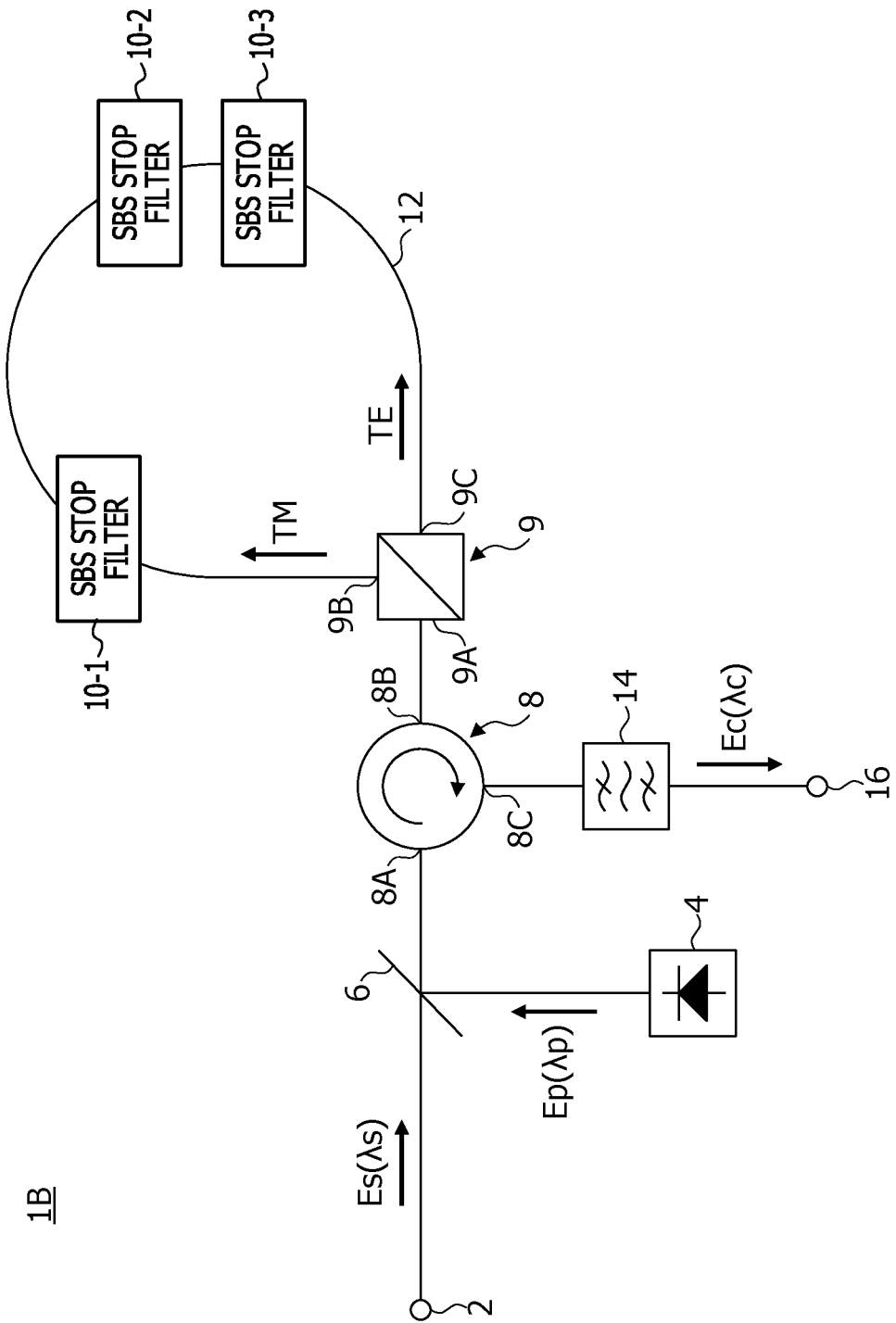
FIG. 7 is a diagram illustrating a modification example of the wavelength conversion apparatus in the first embodiment.

FIG. 7 is a schematic diagram of a wavelength conversion apparatus 1B serving as a modification example of the wavelength conversion apparatus 1A in FIG. 3. In the wavelength conversion apparatus 1B, a plurality of the SBS stop filters 10-1, 10-2, and 10-3 (hereinafter, collectively referred to as "the SBS stop filter 10" as appropriate) is inserted into the PMF 12. The configuration other than that is similar to that in FIG. 3, and overlapping explanations are omitted.

The SBS stop filters 10-1 to 10-3 are inserted to remove SBS backscattering that is generated in respective segments between the adjacent SBS stop filters 10. When the single SBS stop filter 10 is used as in FIG. 3, the SBS backscattered light that is generated in the PMF 12 posterior to the SBS stop filter 10 may affect the wavelength conversion efficiency. Therefore, as in FIG. 7, the SBS stop filters 10-1 to 10-3 are inserted, thereby enhancing the reduction effect of the SBS backscattered light.

Figure 8A:
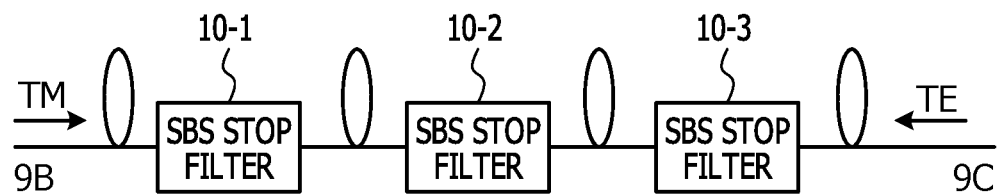
FIGS. 8A to 8C are schematic diagrams illustrating an effect by the wavelength conversion apparatus in FIG. 7.
Figure 8B:
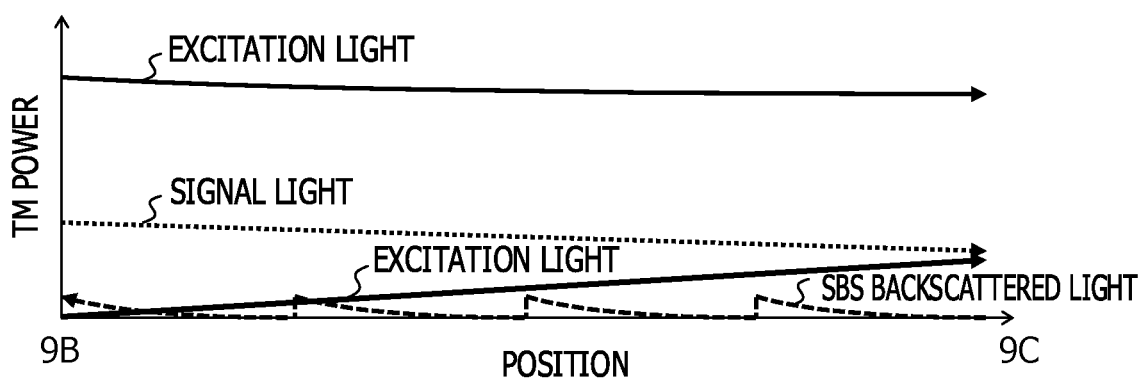
Figure 8C:
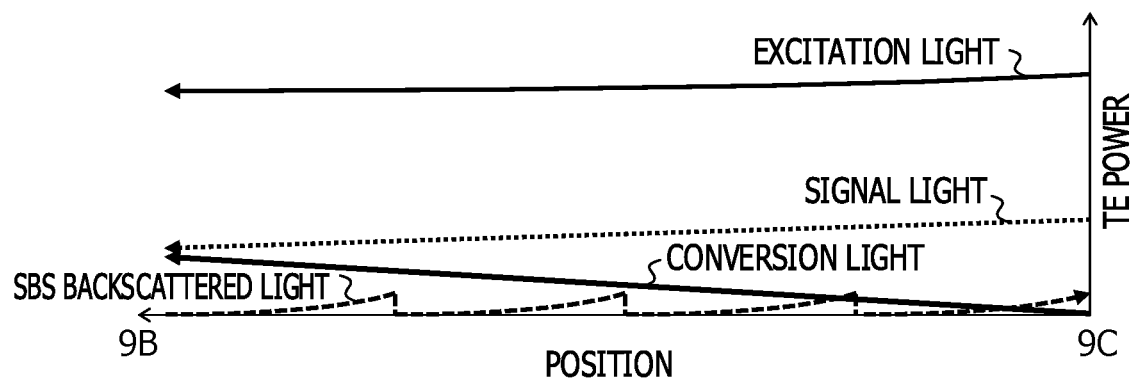

FIGS. 8A to 8C are schematic diagrams illustrating an effect by the wavelength conversion apparatus 1B in FIG. 7. In FIGS. 8A to 8C, for convenience, the PMF 12 is not looped (FIG. 8A), each of the SBS stop filters 10 reduces the growth of the SBS backscattered light that is generated in each excitation light that bidirectionally propagates.

In the excitation light having entered the PMF 12 from the port 9B of the PBS 9, SBS backscattered light in the reverse direction is generated by the non-linear optical effect, however, this SBS backscattered light is reset each time when passing through the SBS stop filter 10. The power lowering of the TM waves by the growth of the SBS backscattered light is reduced, so that it is possible to obtain the sufficient conversion light power at the port 9C (FIG. 8B). Similarly, in the excitation light having entered the PMF 12 from the port 9C, SBS backscattered light in the reverse direction is generated, however, this SBS backscattered light is reset each time when passing through the SBS stop filter 10. The power lowering of the TE waves by the growth of the SBS backscattered light is reduced, so that it is possible to obtain the sufficient conversion light power at the port 9B (FIG. 8C).

The TM waves (including excitation light, signal light, and conversion light) having propagated through the loop of the PMF 12 are multiplexed with the TE waves (excitation light, signal light, and conversion light) in the PBS 9, and are outputted from the port 9A.

Figure 9:
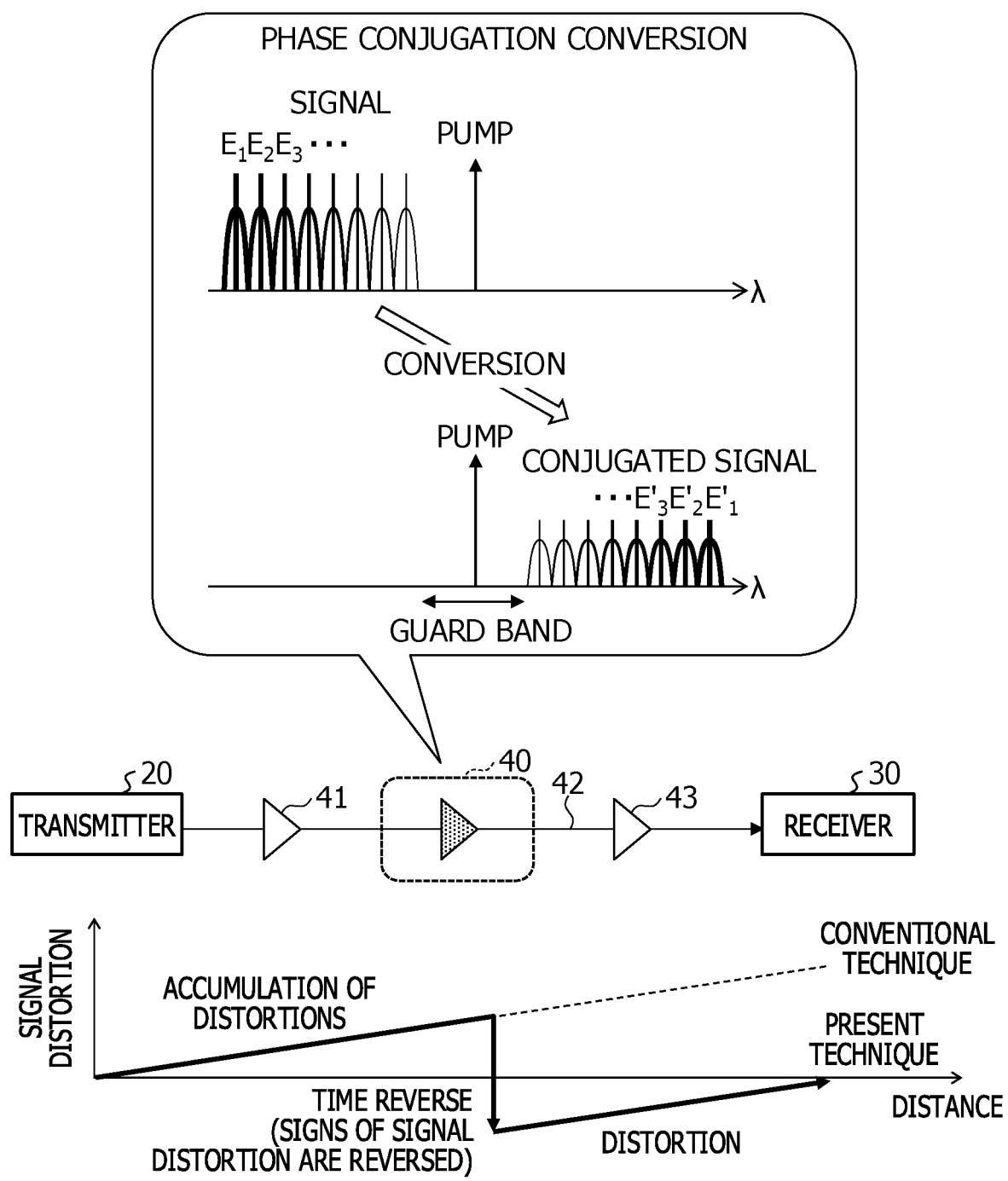
FIG. 9 is a diagram illustrating an example in which the configuration in the first embodiment is applied to phase conjugation conversion.

FIG. 9 illustrates an example in which the configuration of the wavelength conversion apparatus 1 (either one of the wavelength conversion apparatuses 1A and 1B may be employed) in the first embodiment is applied to phase conjugation conversion. A phase conjugation converter 40 is inserted in the middle of a transmission path 42 between a transmitter 20 and a receiver 30. The phase conjugation converter 40 has the same configuration as that of the wavelength conversion apparatus 1B, for example. Optical amplifiers 41 and 43 are inserted into the transmission path 42, and compensate for the propagation loss.

The signal light is subjected to an influence of the waveform distortion due to the wavelength dispersion during the propagation in the transmission path 42. The waveform distortion is accumulated along with the propagation. The phase conjugation converter 40 is provided in the middle of the transmission path 42 to convert in opposite phase the propagating signal wavelength in a wavelength region of mapping positions symmetrical to the excitation light (indicated as "Pump" in FIG. 9). When a plurality of wavelength signals are densely multiplexed, the wavelength signals are collectively converted in opposite phase in a wavelength region symmetrical to the excitation light. The phase conjugation conversion waves have a behavior as if original signal waves have been time inversed, distortions that are accumulated in the first half of a transmission path are compensated by distortions due to wavelength dispersion in the latter half of the transmission path.

The SBS stop filter 10 that effectively removes only SBS backscattered light is inserted into the non-linear optical medium of the phase conjugation converter, so that it is possible to convert a wavelength multiplexed signal to be inputted into phase conjugation signal light with high conversion efficiency. This enables distortions by the wavelength dispersion to be compensated.

<Application to Optical Parametric Amplification>

Figure 10:
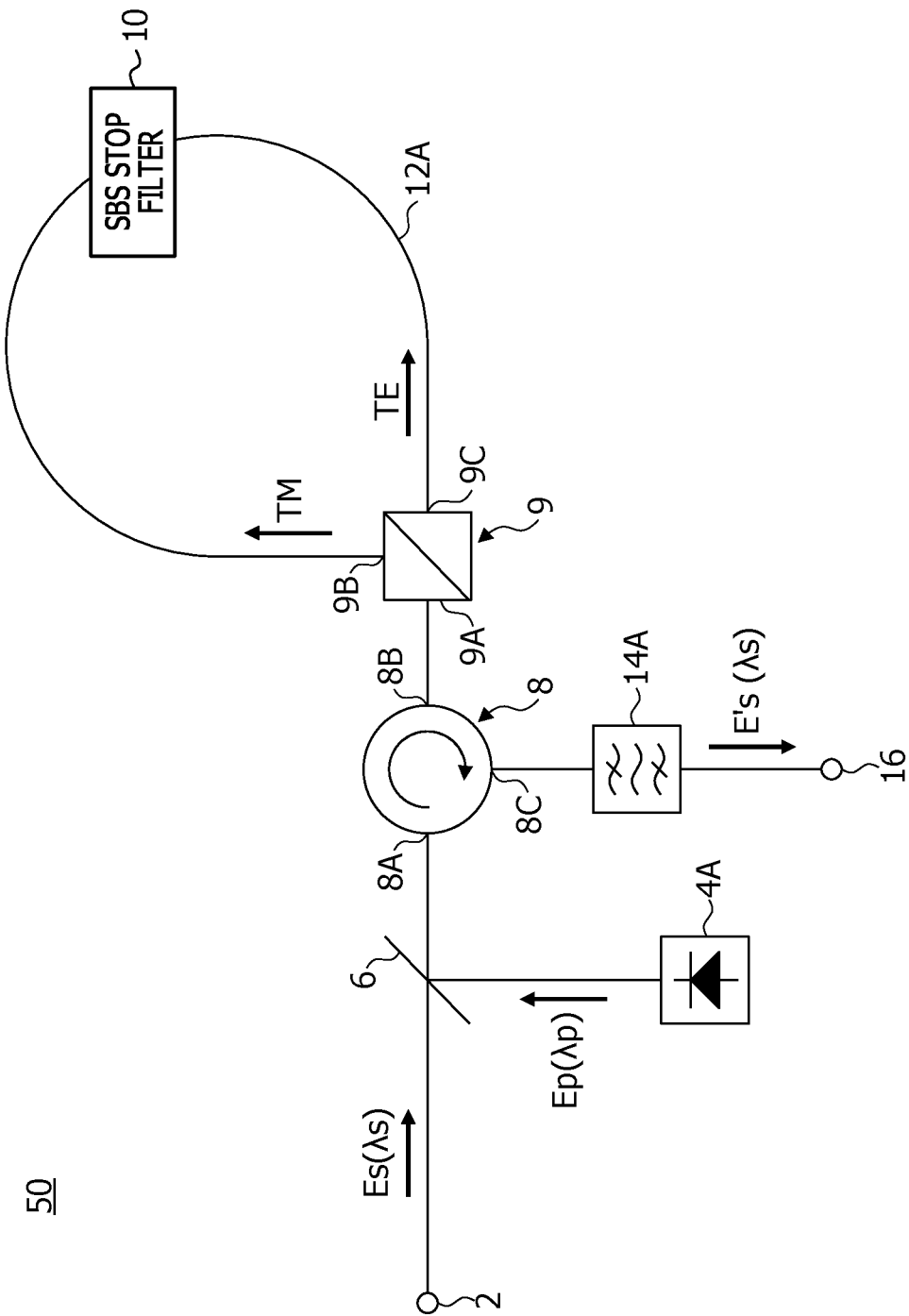
FIG. 10 is a diagram illustrating an example in which the configuration in the first embodiment is applied to optical parametric amplification.

FIG. 10 illustrates an example in which the configuration in the first embodiment is applied to optical parametric amplification. The configuration itself of an optical parametric amplifier 50 is similar to the configuration in FIG. 3 or 7, however, an object is to amplify signal light, rather than to acquire wavelength conversion light (idler light). Accordingly, from the light entered the band path filter 14A from the port 8C of the optical circulator 8, an amplified signal light $E'_S$ is taken out.

In the optical parametric amplifier 50, the wavelength and the output power of an excitation light source 4A, the non-linear constant and the propagation constant of a PMF 12A, and the wavelength of the signal light are controlled so as to satisfy the conditions in the optical parametric amplification.

Figure 11B:
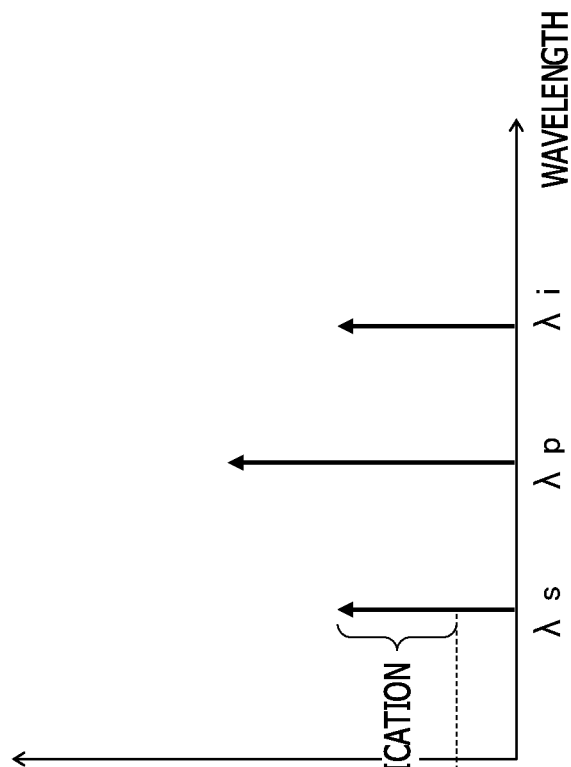
FIGS. 11A and 11B are diagrams for explaining a principle of the optical parametric amplification.
Figure 11A:
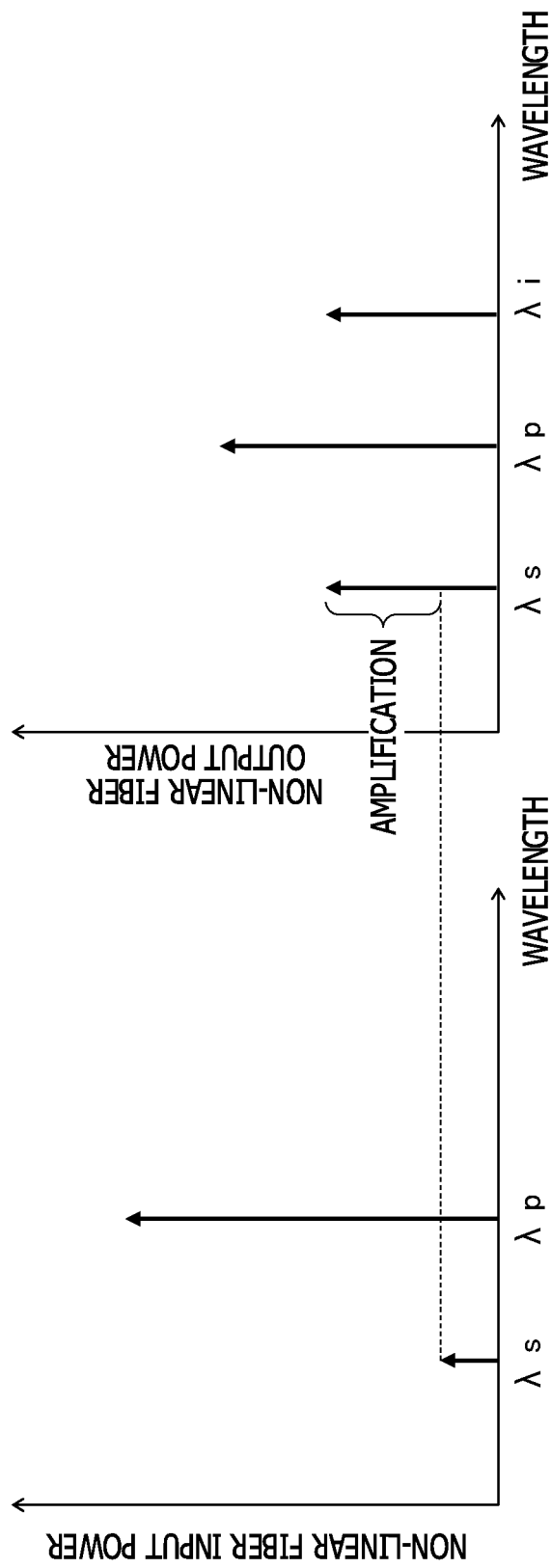

FIGS. 11A and 11B are diagrams for explaining a principle of parametric amplification. Light that enters the PMF 12A includes signal light and excitation light wavelengths of which are different from each other (FIG. 11A). The wavelength of the signal light is denoted by $\lambda_S$, and the wavelength of the excitation light is denoted by $\lambda_P$. When signal light and excitation light frequencies of which are different from each other enter the PMF 12 that is a non-linear optical medium, by the non-linear optical effect, conversion light or idler light having a wavelength λ that matches neither signal light nor excitation light is generated. When the condition of the optical parametric amplification is satisfied in the system in FIG. 10, the power of the signal light that is outputted from the PMF 12A is more amplified by the power of the excitation light than before the incidence, and outputted (FIG. 11B).

Although one excitation light wavelength $\lambda_P$ is illustrated in FIGS. 11A and 11B, when excitation light of two waves (for example, $\lambda_{P1}$ and $\lambda_{P2}$) is used, conversion light of $\lambda_i$ is generated (non-degenerate four wave mixing) on an opposite side of signal light of $\lambda_S$ by being $\lambda_{P1}$ and $\lambda_{P2}$ sandwiched, and input signal light is amplified with the energy of the two excitation light.

A generation condition for the optical parametric amplification is a phase matching condition in which the non-linearity of the PMF 12A is considered $$\Delta\beta'=\Delta\beta-2\gamma P_P=0 \tag{3},$$

where $\Delta\beta$ is a phase matching condition expressed by $$\Delta\beta=(\beta_P-\beta_S)+(\beta_P-\beta_i) \tag{4},$$

where γ is a non-linear optical constant, and $P_P$ is excitation optical power.

Out of the parameters of the phase matching condition in the formula (4), $\beta_P$ is a propagation constant of excitation light, $\beta_S$ is a propagation constant of signal light, and $\beta_i$ is a propagation constant of idler light that is generated by four wave mixing.

In the optical parametric amplifier 50, when the wavelength $\lambda_S$ of incident signal light is known, the non-linear constant and the propagation constant of the PMF 12A, the wavelength and the excitation optical power of the excitation light source 4A are designed to satisfy the formula (3). SBS backscattering in the polarization bidirectionally propagating through the PMF 12A is removed by the SBS stop filter 10, and thus the power lowering of the excitation light $E_P$ by the SBS backscattering is reduced, as a result, it is possible to amplify the signal light with high efficiency, and to take out the signal light $E'_S$ amplified to the high power.

<Application to Optical Transmission System>

FIG. 12 is an overview diagram of an optical transmission system 600 in which the wavelength conversion apparatus 1 in the first embodiment is used. In this example, the wavelength conversion apparatus 1B in FIG. 7 is used, but the wavelength conversion apparatus 1A in FIG. 3 may be used.

The optical transmission system 600 includes a transmission device 60TX, a reception device 60RX, and an optical transmission path 602 that connects these devices. The transmission device 60TX and the reception device 60RX are one example of the transmission apparatus. Generally, for bidirectional communication, the transmission device 60TX and the reception device 60RX are incorporated in one transmission apparatus.

The wavelength conversion apparatus 1B (or 1A) in the first embodiment enables the wavelength conversion by an optical transceiver in a single band or a transmission apparatus including an optical transponder.

The transmission device 60TX is designed to deal with wavelength signals in a C band, for example, and includes C-band transmitters 21-1 to 21-$N_L$, 22-1 to 22-$N_C$, and 23-1 to 23-$N_S$.

Signals having respective wavelengths outputted from the transmitters 21-1 to 21-$N_L$ in a first group are multiplexed by a C-band wavelength multiplexer 61-1, amplified by an optical amplifier 41-1, and inputted into a wavelength conversion apparatus 1Ba. The wavelength conversion apparatus 1Ba converts the wavelength band of the inputted WDM signal from the C band to an L band. The wavelength conversion apparatus 1Ba includes the SBS stop filter 10 that blocks SBS backscattered light, and the excitation light source 4 (see FIG. 7). The wavelength of the excitation light source 4 in the wavelength conversion apparatus 1Ba is set to a wavelength suitable for the conversion from the C band to the L band, for example, to 1565 nm. The WDM signal converted into the L band is amplified by an L-band optical amplifier 44, and inputted into a wavelength multiplexer 61.

Signals having respective wavelengths outputted from the transmitters 22-1 to 22-$N_C$ in a second group are multiplexed by a C-band wavelength multiplexer 61-2, and amplified by an optical amplifier 41-2. The WDM signal in the second group is inputted into the wavelength multiplexer 61 after the amplification without being subjected to the wavelength conversion.

Signals having respective wavelengths outputted from the transmitters 23-1 to 23-$N_S$ in a third group are multiplexed by a C-band wavelength multiplexer 61-3, amplified by an optical amplifier 41-3, and inputted into a wavelength conversion apparatus 1Bb. The wavelength conversion apparatus 1Bb converts the wavelength band of the inputted WDM signal from the wavelength in the C band to the wavelength in an S band. The wavelength conversion apparatus 1Bb includes the SBS stop filter 10 that blocks SBS backscattered light, and the excitation light source 4 (see FIG. 7). The wavelength of the excitation light source 4 in the wavelength conversion apparatus 1Bb is set to a wavelength suitable for the conversion from the C band to the S band, for example, to 1530 nm. The WDM signal converted into the S band is amplified by an L-band optical amplifier 45, and inputted into the wavelength multiplexer 61.

The wavelength multiplexer 61 performs multiplexing of the L-band WDM signal, the C band WDM signal, and the S-band WDM signal, and outputs the multiplexed WDM signal to the transmission path. This allows the broadband communication. The WDM signal having propagated through the optical transmission path 602 is received by the reception device 60RX.

The reception device 60RX is designed to deal with wavelength signals in the C band, for example, and includes C-band receivers 31-1 to 31-$N_L$, 32-1 to 32-$N_C$, and 33-1 to 33-$N_S$.

The WDM signal having propagated through the optical transmission path 602 is separated into three wavelength bands of the L band, the C band, and the S band by a wavelength demultiplexer 63 of the reception device 60RX. The L-band reception signal is amplified by an L-band optical amplifier 46, and inputted into a wavelength conversion apparatus 1Bc. The wavelength conversion apparatus 1Bc converts the wavelength band of the inputted reception signal from the wavelength in the L band to the wavelength in the C band. This wavelength conversion process is a reverse process of the phase conjugation conversion from the signal light to the conversion light in FIG. 9.

The wavelength conversion apparatus 1Bc includes the SBS stop filter 10 that blocks SBS backscattered light, and the excitation light source 4. The wavelength of the excitation light source 4 in the wavelength conversion apparatus 1Bc is set to a wavelength suitable for the conversion from the L band to the C band, for example, to 1565 nm. The reception light signal converted into the C band is amplified by a C-band optical amplifier 41-4, and inputted into a C-band wavelength demultiplexer 62-1. The wavelength demultiplexer 62-1 separates the C-band reception signal into respective sub-carriers, and supplies the respective sub-carriers to the corresponding C-band receivers 31-1 to 31-$N_L$.

The C-band reception signal separated by the wavelength demultiplexer 63 is amplified by the C-band optical amplifier 41-5, and without being subjected to the wavelength conversion, is separated into respective sub-carriers by a wavelength demultiplexer 62-2 without any change. Signals of the respective sub-carriers are supplied to the corresponding C-band receivers 32-1 to 32-$N_C$.

The S-band reception signal separated by the wavelength demultiplexer 63 is amplified by an S-band optical amplifier 47, and inputted into a wavelength conversion apparatus 1Bd. The wavelength conversion apparatus 1Bd converts the wavelength band of the inputted reception signal from the wavelength in the S band to the wavelength in the C band. This wavelength conversion process is a reverse process of the phase conjugation conversion from the signal light to the conversion light in FIG. 9.

The wavelength conversion apparatus 1Bd includes the SBS stop filter 10 that blocks SBS backscattered light, and the excitation light source 4. The wavelength of the excitation light source 4 in the wavelength conversion apparatus 1Bd is set to a wavelength suitable for the conversion from the S band to the C band, for example, to 1530 nm. The reception light signal converted into the C band is amplified by a C-band optical amplifier 41-6, and inputted into a C-band wavelength demultiplexer 62-3. The wavelength demultiplexer 62-3 separates the C-band reception signal into respective sub-carriers, and supplies the respective sub-carriers to the corresponding C-band receivers 33-1 to 33-$N_S$.

The optical transmission system 600 allows the conversion into two or more signal bands on both of the transmission side and the reception side with high efficiency to expand the communication band, thereby allowing the large-capacity optical communication.

Second Embodiment

Figure 13:
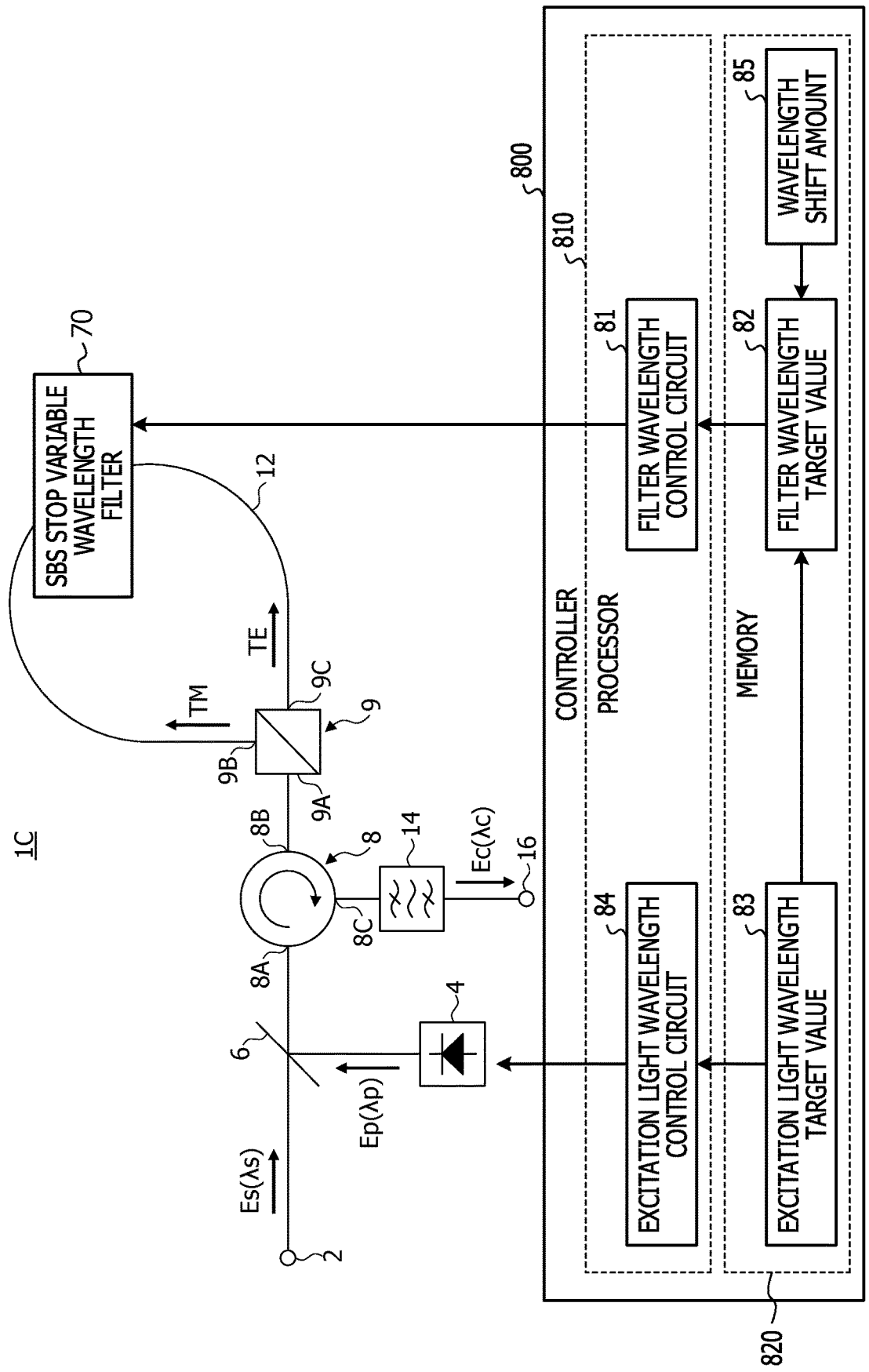
FIG. 13 is a schematic diagram of a wavelength conversion apparatus according to a second embodiment.

FIG. 13 is a schematic diagram of a wavelength conversion apparatus 1C according to a second embodiment. In the second embodiment, the SBS stop filter is replaced with a variable wavelength filter.

A wavelength at which the wavelength dispersion is zero is present in a non-linear optical medium. When the wavelength of the excitation light matches a zero-dispersion wavelength, the broadband wavelength conversion becomes possible. Therefore, it is desirable to adjust the wavelength of the excitation light source in accordance with the zero-dispersion wavelength. When the wavelength of the excitation light becomes variable, the wavelength of SBS backscattered light that is generated with energy apart from the excitation light wavelength by a certain wavelength or a certain frequency of vibration (for example, 11 GHz) also fluctuates. When the narrow-band transmitting film 102 (see FIG. 4) having a fixed wavelength is used as the SBS stop filter 10, such a problem may occur that a removing band of the SBS stop filter 10 is deviated from the actual wavelength of SBS backscattered light or excitation light that travels in the progression direction is blocked.

Therefore, the stop wavelength of the SBS stop filter is controlled by being corresponded to the wavelength of the excitation light.

The basic configuration of the wavelength conversion apparatus 1C is similar to that of the wavelength conversion apparatus 1A in FIG. 3. A different point is in that the SBS stop filter to be inserted into the looped polarization maintaining fiber (PMF) 12 is replaced with an SBS stop variable wavelength filter 70.

The wavelength conversion apparatus 1C is connected to a controller 800 that controls the wavelength of the excitation light source 4 and the wavelength of the SBS stop variable wavelength filter 70. The controller 800 includes a processor 810 and a memory 820.

The processor 810 includes an excitation light wavelength control circuit 84 that controls the wavelength of the excitation light source 4, and a filter wavelength control circuit 81 that controls the wavelength of the SBS stop variable wavelength filter 70. The memory 820 holds an excitation light wavelength target value 83, a filter wavelength target value 82, and a wavelength shift amount 85 by the SBS.

The excitation light wavelength target value 83 is able to be set by measuring in advance a zero-dispersion wavelength of the PMF 12 to be used. The shift amount of wavelength by the SBS is also able to be set by measuring in advance the shift amount of wavelength or frequency of vibration (see FIG. 6) by the SBS backscattering, depending on the materials for the PMF 12 to be used. When the target wavelength of the excitation light source 4 and the shift amount of wavelength by the SBS are known, a target value of the SBS stop variable wavelength filter 70 is able to be set.

The excitation light wavelength control circuit 84 controls the wavelength of the excitation light source 4 by referring to the excitation light wavelength target value 83 in the memory 820. A part of the excitation light $E_P$ that is outputted from the excitation light source may be monitored, and a monitoring result may be fed back to the excitation light wavelength control circuit 84.

The SBS stop variable wavelength filter 70 may be implemented in such a manner that the zero-dispersion wavelengths that are different depending on the material, the configuration, and the like of the non-linear medium are measured in advance, and several types of the narrow-band transmitting films 102 are formed, for example. In this case, each of the narrow-band transmitting films 102 is designed to allow the transmission of only SBS backscattered light having a frequency apart by 10 to 11 GHz from the zero-dispersion wavelength of the corresponding non-linear medium. Alternatively, in accordance with the control wavelength of the excitation light, a blocker that blocks the SBS backscattered light may be used.

Figure 14:
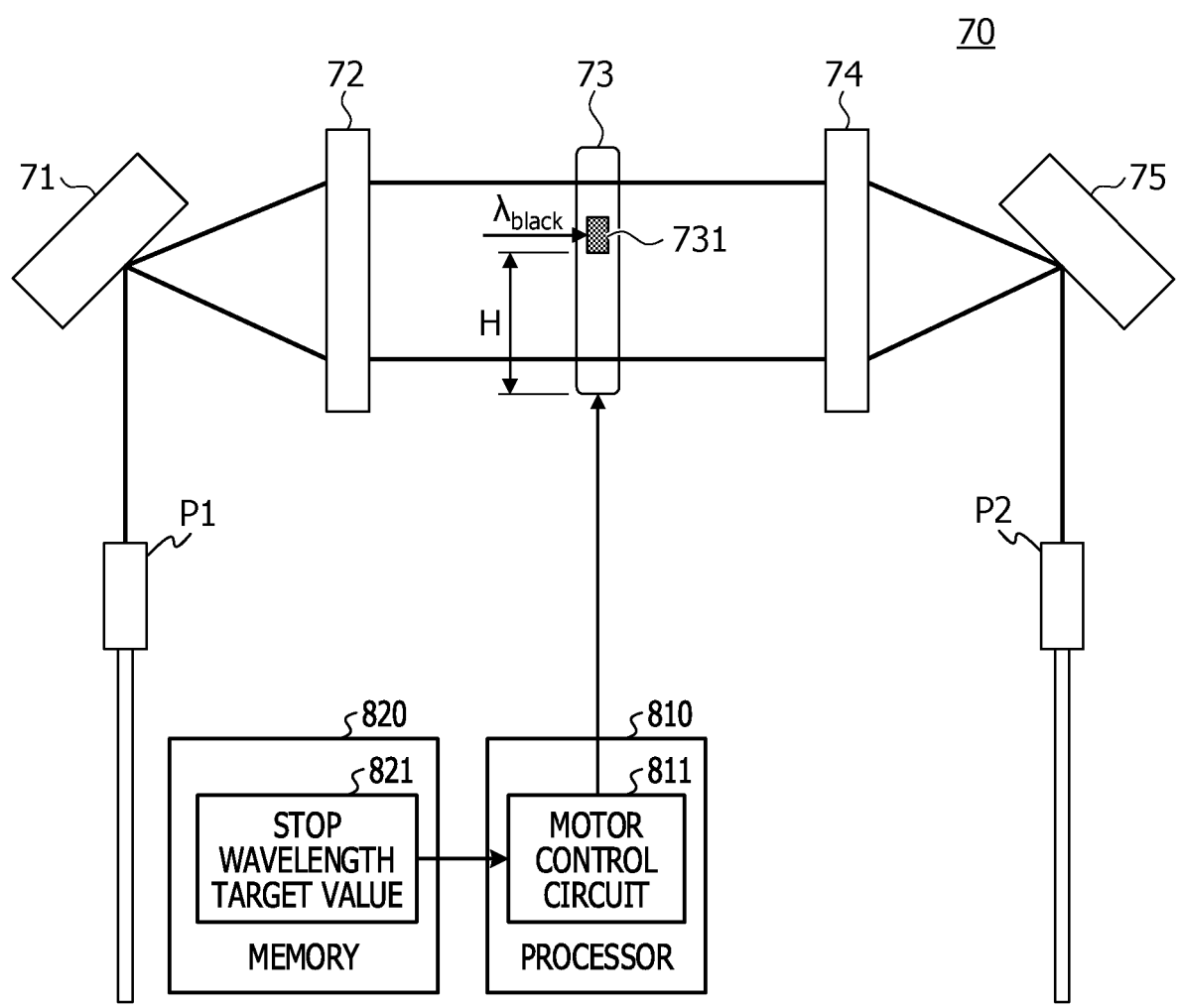
FIG. 14 is a diagram illustrating a configuration example of an SBS stop variable wavelength filter that is used in the wavelength conversion apparatus in FIG. 13.

FIG. 14 illustrates a configuration example of the SBS stop variable wavelength filter 70 in which a blocker is used. The wavelength of the excitation light is controlled so as to approach the zero-dispersion wavelength, thus, a blocker that physically move in accordance with the control wavelength of the excitation light, and a spectrometer are used.

The SBS stop variable wavelength filter 70 includes an input/output port P1, a multiplexer-demultiplexer 71, a collimator lens 72, a movable blocker 73, a collimator lens 74, a multiplexer-demultiplexer 75, and an input/output port P2. The movable blocker 73 includes a blocker 731 that blocks only a desired wavelength at a specific position. A motor control circuit 811 of the processor 810 controls a position of the blocker 731 or a height H of a slit to the blocker 731. A target value 821 of a stop wavelength is stored in advance in the memory 820, and the processor 810 controls the movable blocker 73 by referring to the memory 820 so as to block the wavelength as a target value. With this configuration, SBS backscattered light is reduced in both of an optical component propagating from the input/output port P1 to the input/output port P2, and an optical component propagating from the input/output port P2 to the input/output port P1.

Other Modification Examples

Figure 15A:
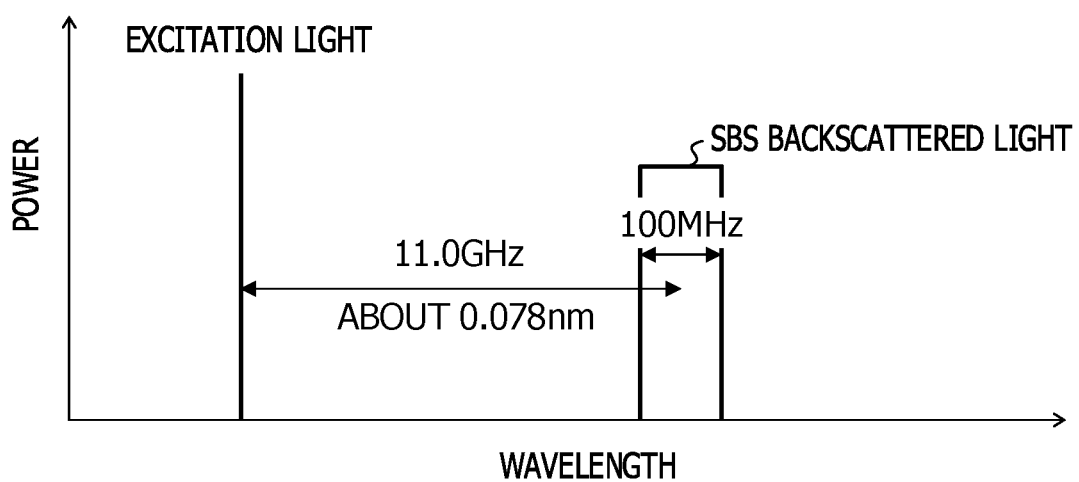
FIGS. 15A and 15B are diagrams illustrating blocking characteristics of a stop filter according to a modification example.
Figure 15B:
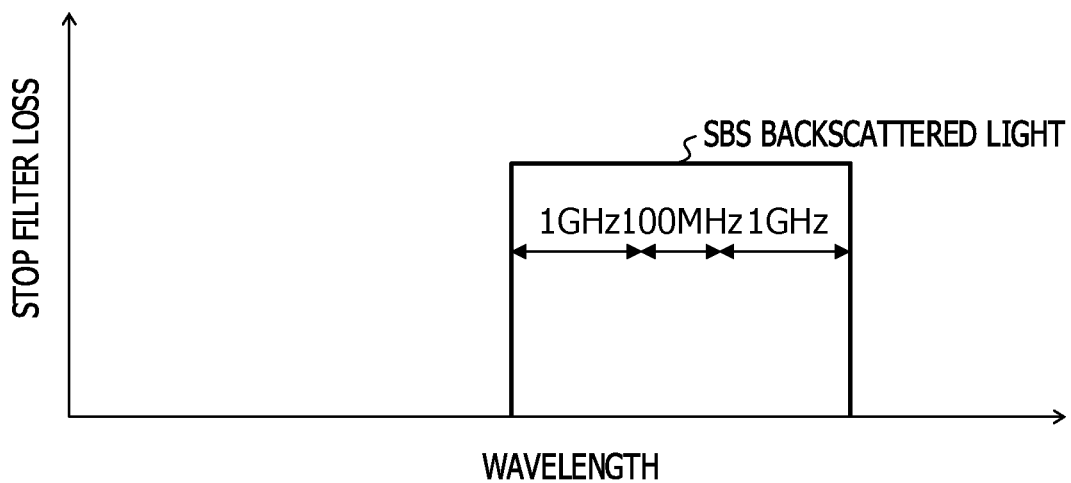

FIGS. 15A and 15B are diagrams illustrating a modification example of a stop wavelength band of SBS backscattered light. The SBS backscattered light is generated at a wavelength shifted from the wavelength of the excitation light by approximately 11.0 GHz. In the above-described embodiments, the narrow-band stop filter removes the SBS backscattered light with the width of approximately 100 MHz.

However, the excitation light source 4 normally has a tolerance of about ±1 GHz, as in FIGS. 15A and 15B, the filter width of the SBS stop filter 10 desirably has a margin only by the tolerance. Even with the margin of ±1 GHz, it is possible to remove the SBS backscattered light by being distinguished from the excitation light, the signal light, and the conversion light.

Figure 16:
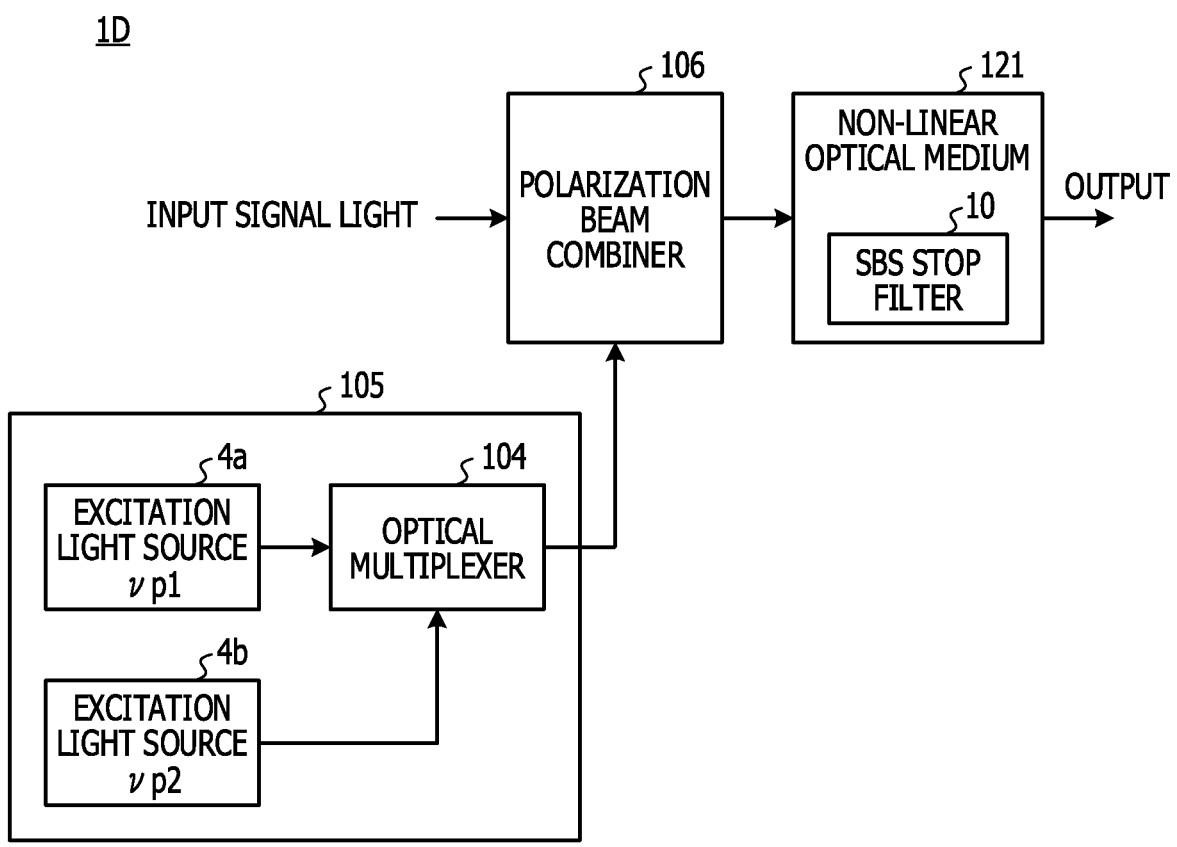
FIG. 16 is a schematic diagram of a non-degenerate FWM wavelength converter in the modification example.

FIG. 16 illustrates a non-degenerate FWM wavelength conversion apparatus 1D as another modification example. The non-degenerate FWM wavelength conversion apparatus 1D uses two excitation light sources 4a and 4b having different excitation light wavelengths to generate four wave mixing in a non-linear optical medium 121. The excitation light source 4a has a frequency $v_{p1}$, and the excitation light source 4b has a frequency $v_{p2}$. The frequency may be replaced with "wavelength". A frequency $v_i$ of conversion light (or idler light) is expressed by, $$v_i = v_{P1} + v_{P2} - v_S,$$

$v_i = v_S + (v_{P2} - v_{P1})$, and the like. Here, $v_S$ is a frequency of signal light to be inputted.

In FIG. 16, $v_{P1} \neq v_{P2}$ is obtained, so that non-degenerate four wave mixing is generated in the non-linear optical medium 121. A light source unit 105 includes the excitation light sources 4a and 4b, and an optical multiplexer 104. Excitation light that is outputted from each of the excitation light sources 4a and 4b is multiplexed by the optical multiplexer 104, and the multiplexed light is outputted from the light source unit 105. The excitation light having different two frequencies is multiplexed with the signal light by a polarization beam combiner 106, and inputted into the non-linear optical medium 121.

When the frequency of signal light to be inputted is denoted by $v_S$, in the non-linear optical medium 121, conversion light having a frequency different from all of the frequencies $v_{P1}$ and $v_{P2}$ of the excitation light and the frequency $v_S$ of the signal light. In this process, SBS backscattering is generated by a non-linear optical effect of the non-linear optical medium 121. The SBS stop filter 10 is inserted into the non-linear optical medium 121, blocks the SBS backscattering, and outputs excitation light, signal light, and conversion light. A configuration in which the narrow-band transmitting films 102 corresponding to the respective two excitation light are provided in series, and SBS backscattered light corresponding to each excitation light is successively removed may be employed.

When a band path filter that allows the transmission of only the wavelength of the conversion light is provided at a post stage of the non-linear optical medium 121, it is possible to use the non-degenerate FWM wavelength conversion apparatus 1D as a wavelength conversion apparatus 1D. The non-linear constant and the propagation constant of the non-linear optical medium 121, the power and the wavelengths of the excitation light sources 4a and 4b, and the wavelength of the signal light may be designed to satisfy the conditions of the parametric amplification. In this case, a band path filter that allows the transmission of only the wavelength of the signal light is provided at the post stage of the non-linear optical medium 121 to allow the wavelength conversion apparatus 1D to be used as an optical parametric amplifier.

Figure 17A:
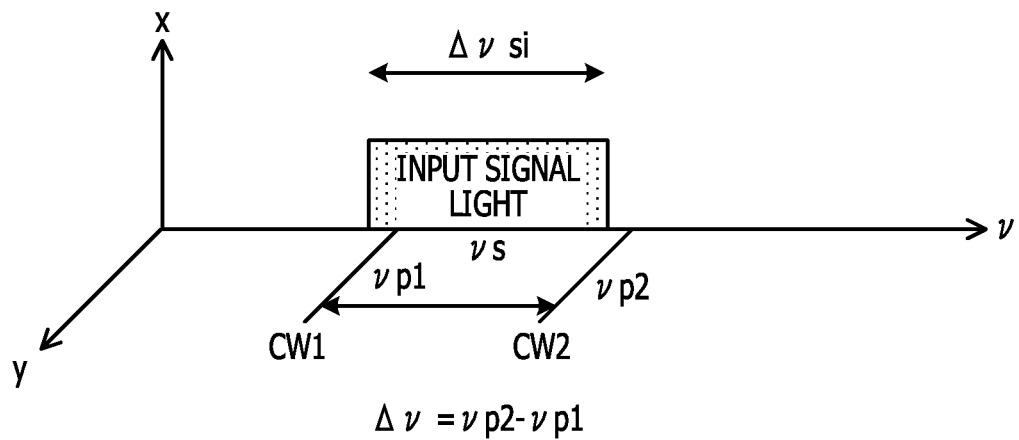
FIGS. 17A and 17B are schematic diagrams illustrating an input signal and an output signal in the non-linear optical medium.
Figure 17B:
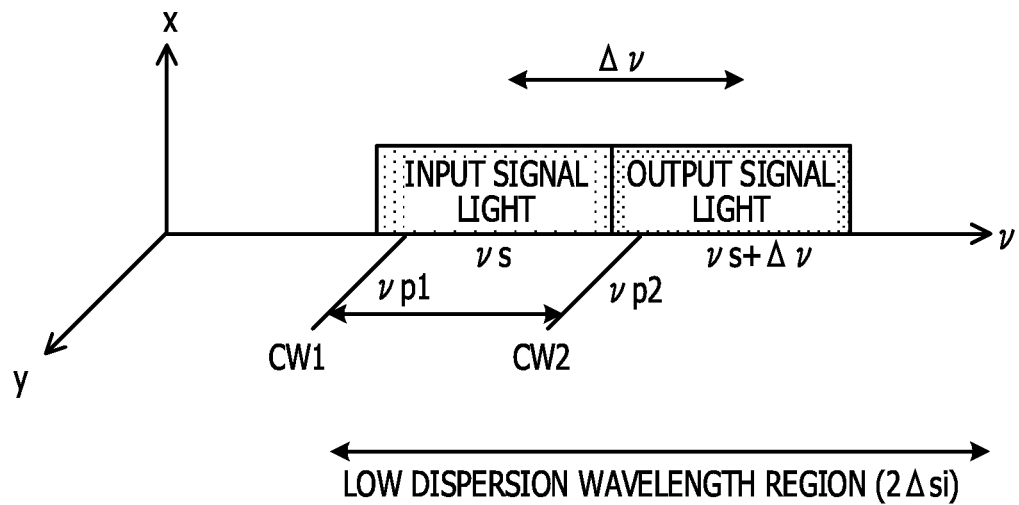

FIGS. 17A and 17B are diagrams for explaining polarization directions of signal light and excitation light, and a polarization direction of conversion light to be outputted, in the wavelength conversion apparatus 1D in FIG. 16. A vibration axis of light is illustrated as an X axis and a Y axis that are orthogonal to each other. An axis orthogonal to an XY plane is denoted by a frequency axis ν. The polarization direction of signal light to be inputted is in parallel with the X axis, and the polarization direction of excitation light is in parallel with the Y axis. Two excitation light, in other words, continuous light CW1 having the frequency $v_{p1}$ and continuous light CW2 having the frequency $v_{p2}$ are used along the frequency axis ν. A frequency difference Δν between the two excitation light is expressed by a formula (5).

$$\Delta v = v_{p2} - v_{p1} \quad (5)$$

A center frequency of the signal light to be inputted is $v_S$, and a signal width thereof is $\Delta v_{Si}$. The signal light is, for example, a WDM signal in which a plurality of sub-carriers is multiplexed. For example, when the WDM signal is a signal in the C band, frequencies (or wavelengths) of the two excitation light may be set in the vicinity of both ends in the C band. A center frequency $v_C$ of conversion light is expressed by a formula (6).

$$v_C = v_S + \Delta v \quad (6)$$

SBS backscattered light is generated by the non-linear optical effect at a frequency position lower by about 10 to 11 GHz for each of the two excitation light. Two SBS stop filters 10 that respectively blocks SBS backscattered light of the two excitation light are used in the non-linear optical medium 121, remove the SBS backscattered light, and take out collectively wavelength converted WDM signal ("output signal light" in FIG. 17B). With this configuration, it is possible to wavelength convert the WDM signal with high efficiency, and implement broadband optical communication.

Figure 18:
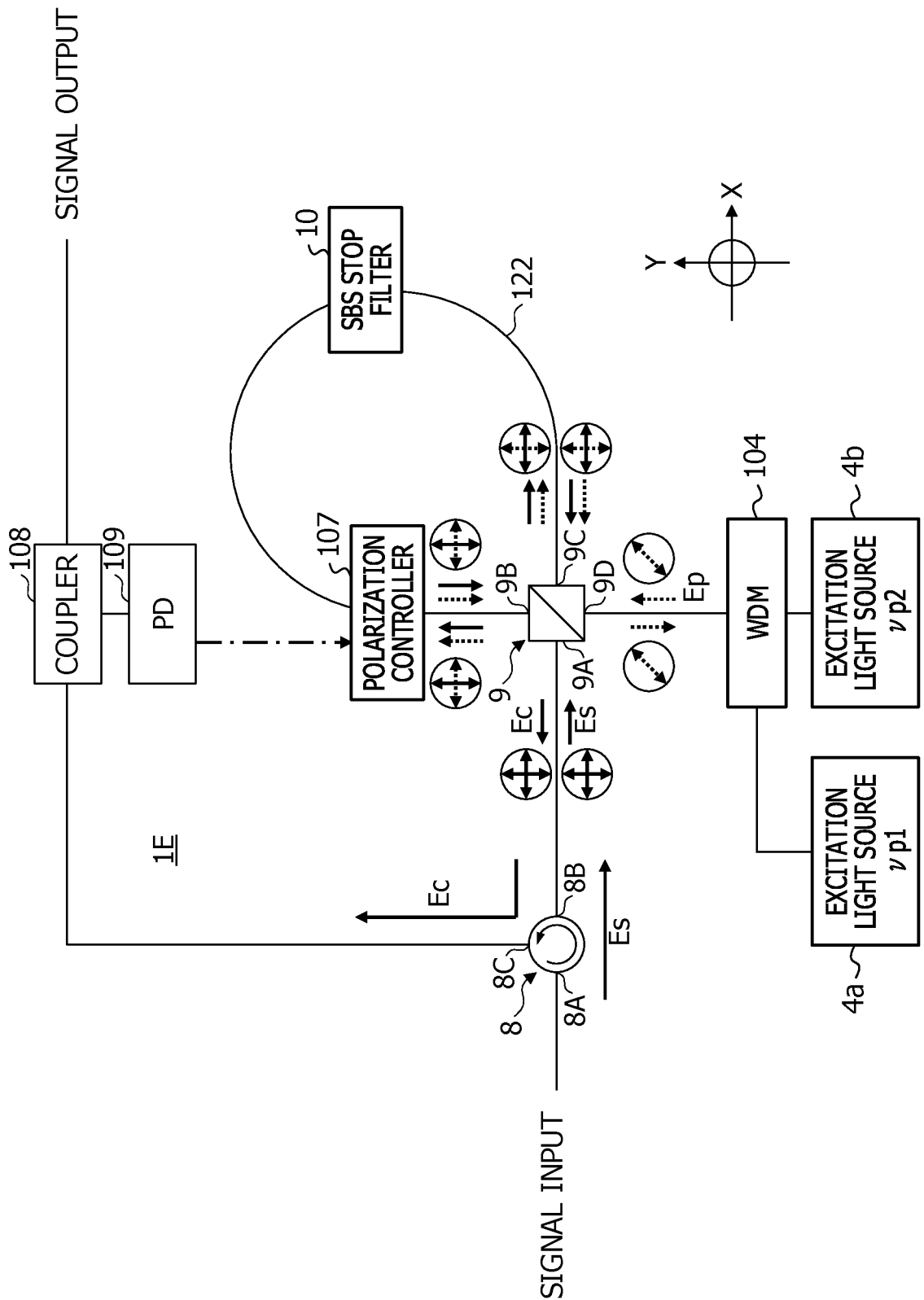
FIG. 18 is a diagram illustrating an example of a polarization diversity configuration.

FIG. 18 illustrates a wavelength conversion apparatus 1E having a polarization diversity configuration as still another modification example. The wavelength conversion apparatus 1E performs wavelength conversion using non-degenerate FWM. The wavelength conversion apparatus 1E includes the optical circulator 8, the excitation light source 4a, the excitation light source 4b, the multiplexer 104, the PBS 9, and a looped non-linear optical fiber 122 that is optically connected to the PBS 9. The SBS stop filter 10 and a polarization controller 107 are inserted into the non-linear optical fiber 122. The non-linear optical fiber 122 is not requested to have a polarization hold function.

The signal light $E_S$ enters the port 8A of the optical circulator 8, is outputted from the port 8B, and enters the port 9A of the PBS 9. As indicated by a solid-line arrow, the signal light $E_S$ includes TM polarization having a polarization plane in the vertical direction (the Y axis direction), and a TE polarization having a polarization plane in the transverse direction (the X axis direction).

The PBS 9 allows the transmission of the polarization in the X axis direction, and reflects the polarization in the Y axis direction. Out of the signal light $E_S$ that enters the port 9A, the polarization in the Y axis direction is reflected by the PBS 9, and enters the non-linear optical fiber 122 from the port 9B. The polarization in the X axis direction passes through the PBS 9, and enters the non-linear optical fiber 122 from the port 9C.

Excitation light ($v_{p1}$) that is outputted from the excitation light source 4a and excitation light ($v_{p2}$) that is outputted from the excitation light source 4b are multiplexed by the multiplexer 104 such as a wavelength division multiplexer (WDM), and enter a port 9D of the PBS 9. The incident timing of the multiplexed excitation light to the PBS 9 and the incident timing of the signal light $E_S$ to the PBS 9 are controlled so as to be synchronized.

As illustrated by a dashed-line arrow, a main axis of polarization of the excitation light $E_P$ that enters the port 9D of the PBS 9 is inclined by 45 degrees with respect to the Y axis or the X axis. Out of the excitation light $E_P$, the polarization component in the X axis direction passes through the PBS 9 and is coupled to the port 9B, and the polarization component in the Y axis direction is reflected by the PBS 9 and is coupled to the port 9C.

As a result, light that enters the non-linear optical fiber 122 from the port 9B includes the signal light $E_S$ having a polarization plane in the Y axis direction and the excitation light $E_P$ having a polarization plane in the X axis direction. The incidence of the excitation light $E_P$ changes the refractive index of the non-linear optical fiber 122, the phase of the signal light $E_S$ is shifted, and conversion light having a new wavelength is generated. SBS backscattered light is generated by the non-linear optical effect.

Meanwhile, light that enters the non-linear optical fiber 122 from the port 9C includes the signal light $E_S$ having a polarization plane in the X axis direction and the excitation light $E_P$ having a polarization plane in the Y axis direction. The incidence of the excitation light $E_P$ changes the refractive index of the non-linear optical fiber 122, the phase of the signal light $E_S$ is shifted, and conversion light having a new wavelength is generated. SBS backscattered light is generated by the non-linear optical effect.

The SBS stop filter 10 removes the SBS backscattered light that is bidirectionally generated in the non-linear optical fiber 122.

The polarization controller 107 controls a polarization plane of propagation light such that the conversion light passes through the PBS 9. Out of light that propagates through the non-linear optical fiber 122 in a clockwise direction and enters the port 9C, conversion light having a polarization plane in the X axis direction passes through the PBS 9 and is coupled to the port 9A, and excitation light having a polarization plane in the Y axis direction is reflected by the PBS 9 and is coupled to the port 9D.

Out of light that propagates through the non-linear optical fiber 122 in the counterclockwise direction and enters the port 9B, conversion light having a polarization plane in the Y axis direction is reflected by the PBS 9 and is coupled to the port 9A, and conversion light having a polarization plane in the X axis direction is reflected by the PBS 9 and coupled to the port 9D. The excitation light having bidirectionally propagated through the non-linear optical fiber 122 is multiplexed in the PBS 9, and the multiplexed excitation light $E_P$ is outputted from the port 9D. As a result of the multiplexing, the main axis of the polarization of the excitation light $E_P$ is inclined by 45 degrees from the X axis direction or the Y axis direction.

The conversion light having bidirectionally entered the PBS 9 is multiplexed in the PBS 9, and the multiplexed conversion light $E_C$ is outputted from the port 9A. The outputted conversion light $E_C$ enters the port 8B of the optical circulator 8, and is outputted from the port 8C. A part of the conversion light $E_C$ outputted from the port 8C is branched by a coupler 108 and monitored by a PD 109, and a monitoring result may be fed back to the polarization controller 107. When the polarization variation of the non-linear optical fiber 122 is reduced, it is possible to control conversion light so as to pass through the PBS 9 with only initial setting without feedback control.

Also with this configuration, it is possible to remove the SBS backscattered light that is bidirectionally generated in the non-linear optical fiber 122, and efficiently take out the conversion light $E_C$.

The above-described embodiments and modification examples are capable of being mutually combined, any combination is possible. For example, in the optical transmission system 600, the wavelength conversion apparatus 1C including the SBS stop variable wavelength filter 70 in the second embodiment may be used. In this case, at least either one of the transmission device 60TX and the reception device 60RX may perform a control that causes the excitation light wavelength in each wavelength conversion apparatus to follow the zero-dispersion wavelength.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wavelength conversion apparatus comprising:
    a multiplexer-demultiplexer configured to include a first port, a second port, and a third port, allow input light including signal light and excitation light having different frequencies to enter the first port, and separate the input light into the second port and the third port;
    a looped non-linear optical medium including one end that is optically connected to the second port of the multiplexer-demultiplexer, another end that is optically connected to the third port of the multiplexer-demultiplexer, and a main axis that rotates by 90 degrees between the second port and the third port;
    a first filter configured to be inserted into the non-linear optical medium, and remove stimulated Brillouin backscattered light that is bidirectionally generated in the non-linear optical medium; and
    a second filter configured to take out, from output light that is multiplexed in the multiplexer-demultiplexer after propagating through the non-linear optical medium and is outputted from the first port, conversion light having a third frequency different from the frequencies of the signal light and the excitation light.

2. The wavelength conversion apparatus according to claim 1, wherein
    the first filter removes the stimulated Brillouin backscattered light at a frequency position shifted from a wavelength of the excitation light to a low-frequency side by 11.0±0.5 GHz.

3. The wavelength conversion apparatus according to claim 2, wherein
    the first filter includes a transmitting film having a prescribed pass band width at the frequency position.

4. The wavelength conversion apparatus according to claim 3, wherein
    the first filter includes a first port and a second port that are connected to halfway points in the loop of the non-linear optical medium, and
    the transmitting film couples, out of propagation light having entered the transmitting film from the first port, an optical component except the stimulated Brillouin backscattered light to the second port, and couples, out of propagation light having entered the transmitting film from the second port, an optical component except the stimulated Brillouin backscattered light to the first port.

5. The wavelength conversion apparatus according to claim 3, further comprising:
    an excitation light source configured to output the excitation light,
    wherein the pass band width of the transmitting film is a width obtained by adding a tolerance of the excitation light source to a spectrum width of the stimulated Brillouin backscattered light.

6. The wavelength conversion apparatus according to claim 1, wherein
    the signal light is a wavelength multiplexed signal in which a plurality of sub-carriers are multiplexed, and
    the conversion light is phase conjugation light in which wavelengths of the plurality of sub-carriers are collectively converted.

7. The wavelength conversion apparatus according to claim 1, wherein
    the first filter is a variable wavelength filter capable of variably setting a stop frequency of the stimulated Brillouin backscattered light.

8. The wavelength conversion apparatus according to claim 7, further comprising:
    a first control circuit configured to control the stop frequency of the first filter; and
    a second control circuit configured to control a wavelength of the excitation light, wherein
    the first control circuit controls the stop frequency in accordance with the wavelength of the excitation light.

9. The wavelength conversion apparatus according to claim 1, further comprising:
    a first excitation light source; and
    a second excitation light source, wherein
    the excitation light includes first excitation light outputted from the first excitation light source, and second excitation light outputted from the second excitation light source and having a frequency different from a frequency of the first excitation light, and
    the conversion light is generated by non-degenerate four wave mixing in the non-linear optical medium.

10. The wavelength conversion apparatus according to claim 9, wherein
    a center frequency of the conversion light is expressed by $v_S+\Delta v$ where a frequency difference between the first excitation light and the second excitation light is denoted by $\Delta v$ and a center frequency of the signal light is denoted by $v_S$.

11. The wavelength conversion apparatus according to claim 9, further comprising:
    a polarization controller configured to be inserted into the loop of the non-linear optical medium, wherein the polarization controller controls a polarization plane of the conversion light such that the conversion light passes through the multiplexer-demultiplexer.

12. A transmission apparatus comprising:
a wavelength conversion apparatus including:
a multiplexer-demultiplexer configured to include a first port, a second port, and a third port, allow input light including signal light and excitation light having different frequencies to enter the first port, and separate the input light into the second port and the third port;
a looped non-linear optical medium including one end that is optically connected to the second port of the multiplexer-demultiplexer, another end that is optically connected to the third port of the multiplexer-demultiplexer, and a main axis that rotates by 90 degrees between the second port and the third port;
a first filter configured to be inserted into the non-linear optical medium, and remove stimulated Brillouin backscattered light that is bidirectionally generated in the non-linear optical medium; and
a second filter configured to take out, from output light that is multiplexed in the multiplexer-demultiplexer after propagating through the non-linear optical medium and is outputted from the first port, conversion light having a third frequency different from the frequencies of the signal light and the excitation light.

13. The transmission apparatus according to claim 12, wherein
the wavelength conversion apparatus converts the signal light in a first band into the conversion light in a second band different from the first band, and
further includes a transmitter that outputs the conversion light in the second band to an optical transmission path.

14. The transmission apparatus according to claim 12, wherein
the wavelength conversion apparatus converts signal light in a second band received from an optical transmission path into the conversion light in a first band different from the second band;
further includes a receiver that processes the conversion light in the first band.

* * * * *